United States Patent
Osada

(10) Patent No.: US 7,460,253 B2
(45) Date of Patent: Dec. 2, 2008

(54) PROGRAM STORABLE IMAGE FORMING APPARATUS, CONTROL METHOD, AND CONTROL PROGRAM

(75) Inventor: Mamoru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 961 days.

(21) Appl. No.: 10/421,883

(22) Filed: Apr. 24, 2003

(65) Prior Publication Data

US 2003/0214666 A1 Nov. 20, 2003

(30) Foreign Application Priority Data

May 17, 2002 (JP) ............................. 2002-143080

(51) Int. Cl.
*G06F 15/00* (2006.01)
(52) U.S. Cl. .................... 358/1.13; 358/1.15; 709/203; 709/217
(58) Field of Classification Search ............... 358/1.13, 358/1.15; 709/203, 217
See application file for complete search history.

(56) References Cited

U.S. PATENT DOCUMENTS

| | | | | |
|---|---|---|---|---|
| 6,003,065 | A * | 12/1999 | Yan et al. ..................... | 709/201 |
| 6,094,698 | A * | 7/2000 | Namikawa .................... | 710/74 |
| 6,629,113 | B1 * | 9/2003 | Lawrence .................... | 707/206 |
| 6,856,994 | B2 * | 2/2005 | Dickey ........................ | 707/101 |
| 6,886,094 | B1 * | 4/2005 | Blandy ........................ | 712/244 |
| 6,898,389 | B2 * | 5/2005 | Osada .......................... | 399/81 |
| 2002/0093683 | A1 * | 7/2002 | Focazio et al. ............. | 358/1.17 |
| 2002/0138446 | A1 * | 9/2002 | Antonin et al. ............... | 705/67 |
| 2003/0014611 | A1 * | 1/2003 | Ferris .......................... | 712/35 |
| 2003/0020948 | A1 * | 1/2003 | Jarvis et al. ................. | 358/1.15 |
| 2004/0098731 | A1 * | 5/2004 | Demsey et al. .............. | 719/328 |

FOREIGN PATENT DOCUMENTS

JP 2001-249814 9/2001

* cited by examiner

*Primary Examiner*—David K. Moore
*Assistant Examiner*—Mark R Milia
(74) *Attorney, Agent, or Firm*—Fitzpatrick, Cella, Harper & Scinto

(57) ABSTRACT

An image forming apparatus has a first execution environment that can interpret and execute a first-format instruction for controlling the image forming apparatus, and a second execution environment that can interpret and execute a second-format instruction defined by a format that does not depend on a type of the image forming apparatus, realized in the first execution environment. The image forming apparatus includes control means for controlling processing of starting execution of the first-format instruction from the second execution environment, using a second-format predetermined instruction, recognition means for recognizing, when interpreting the second-format instruction by executing application software in the second execution environment, whether or not an instruction string to be executed is the second-format predetermined instruction, and control means for controlling the image forming apparatus by starting and executing the first-format instruction via the second-format predetermined instruction when the recognition means has recognized that the instruction to be executed is the second-format predetermined instruction, and for controlling the image forming apparatus so as to execute the second-format predetermined instruction in the second execution environment when the recognition means has recognized that the instruction to be executed is not the second-format predetermined instruction.

15 Claims, 19 Drawing Sheets

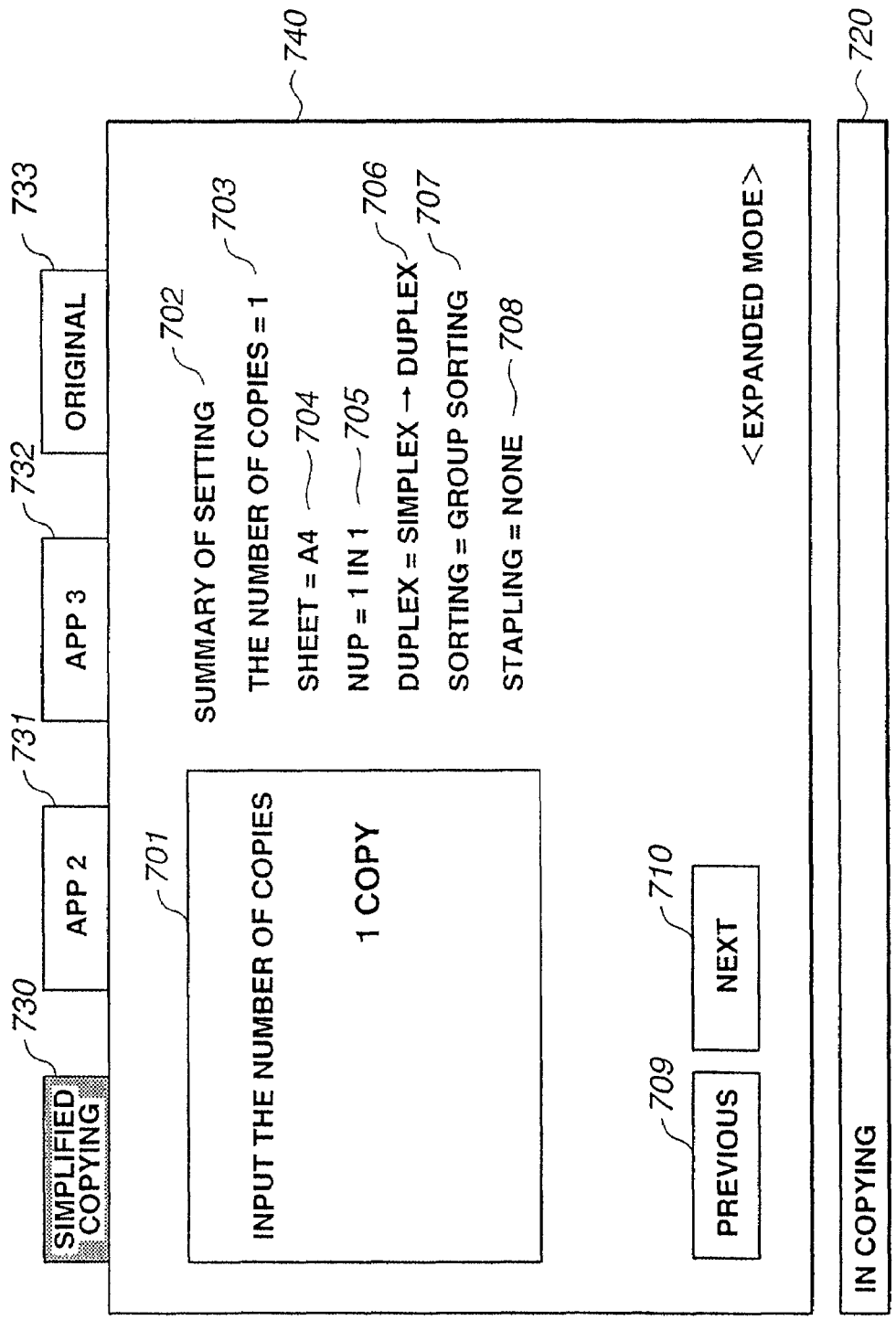

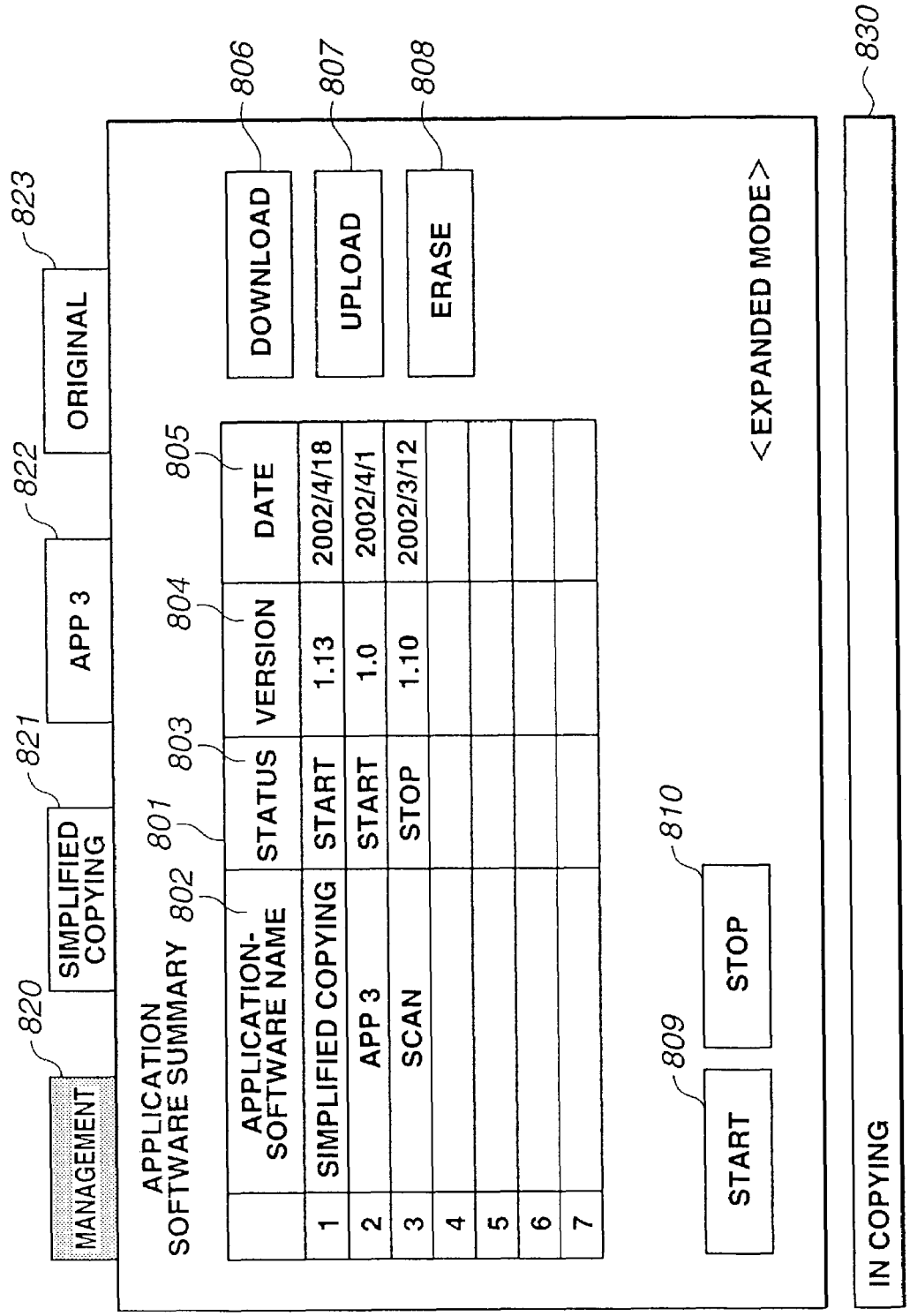

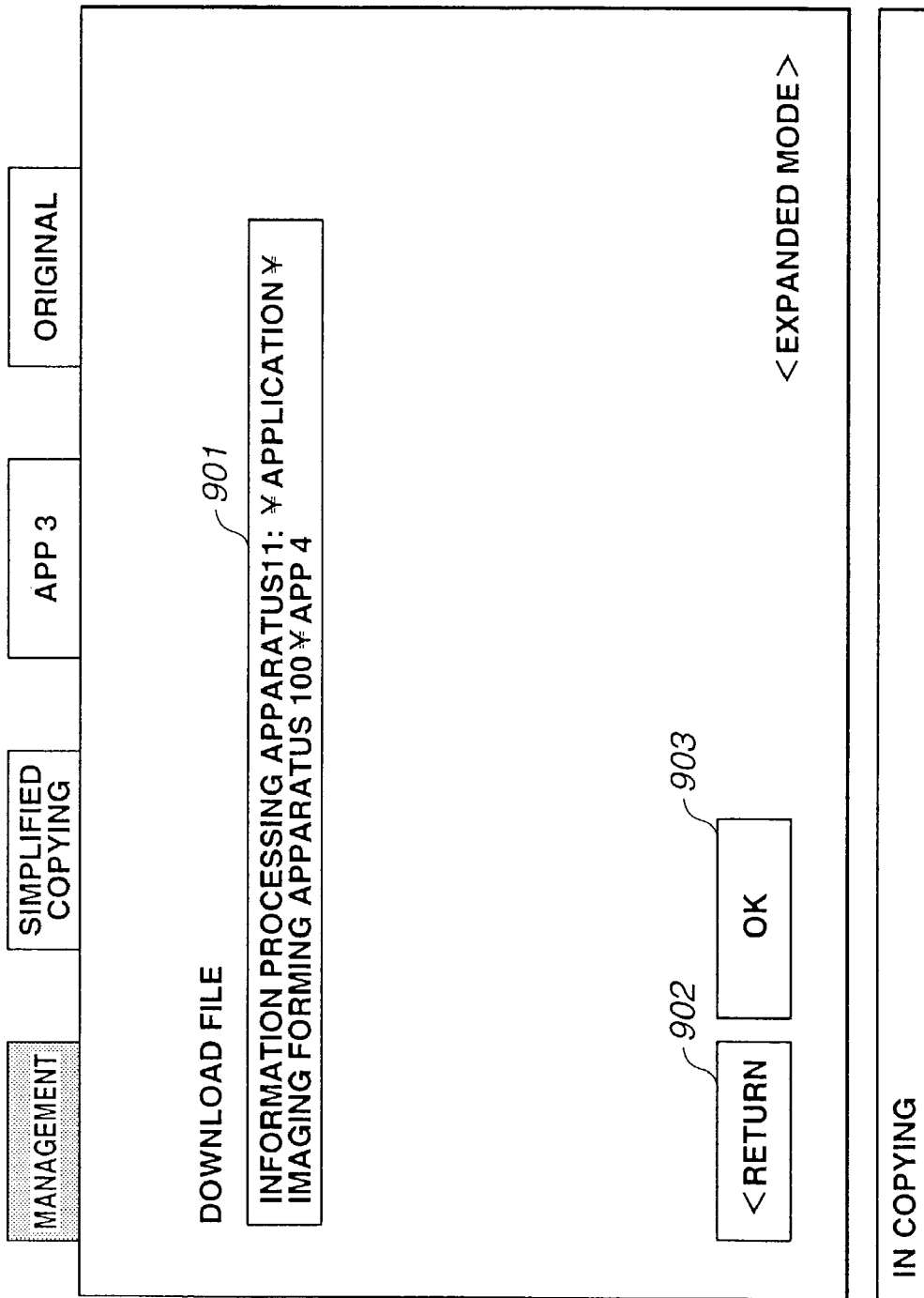

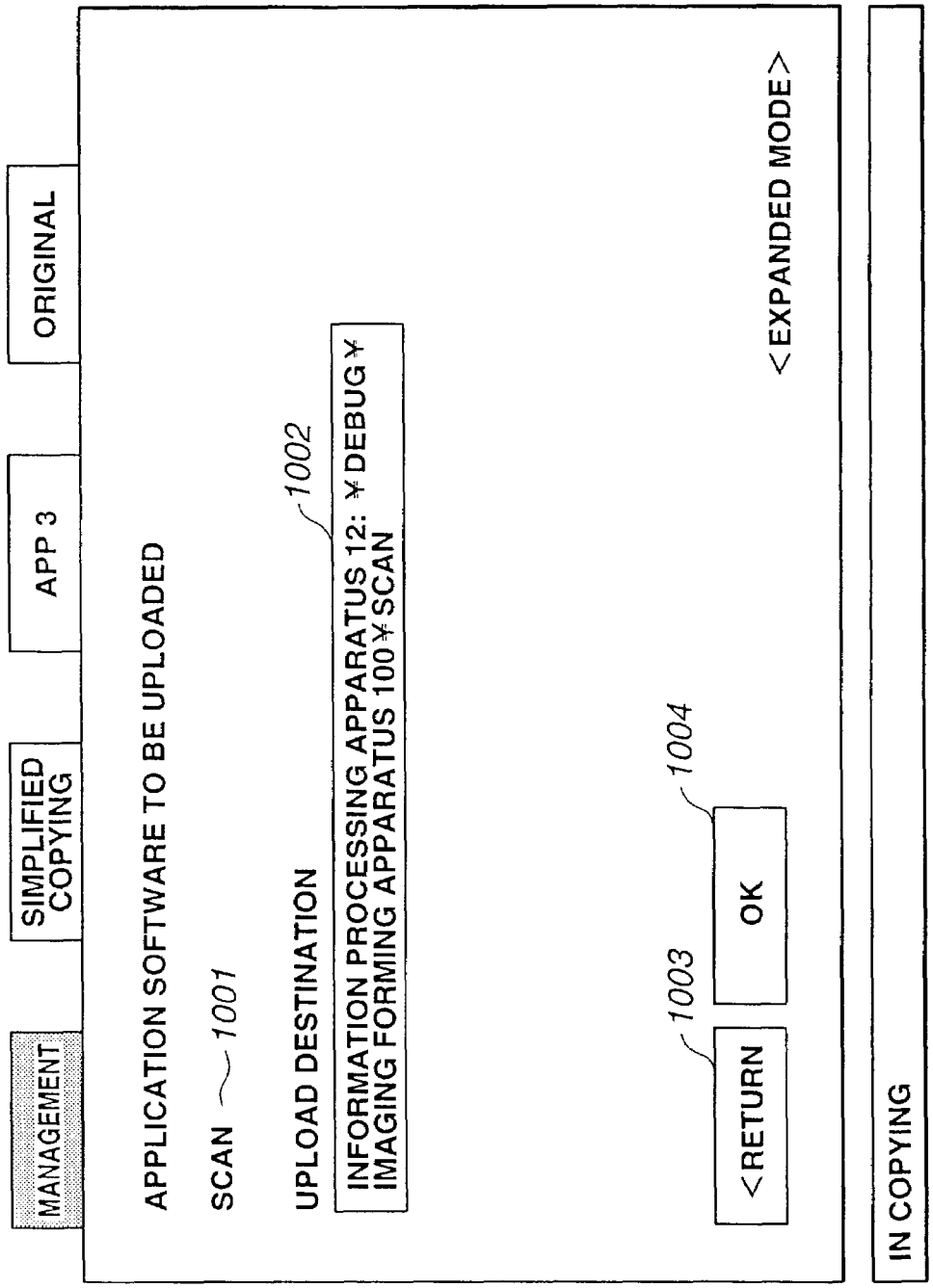

FIG.11

| APPLICATION SOFTWARE NAME | STATUS | VERSION | DATE | STORING LOCATION | TYPE | UI | FRAMEWORK | API |
|---|---|---|---|---|---|---|---|---|
| MANAGEMENT | START | 1.0 | 2002/2/4 | /DISK1/APP/SYS/APPMNG/APPMNG | SYSTEM | YES | 1.0 | 1.2 |
| SIMPLIFIED COPYING | START | 1.13 | 2002/4/18 | /DISK1/APP/GEN/ESYCPY/ESYCPY | GENERAL | YES | 1.0 | 1.2 |
| APP3 | START | 1.0 | 2002/4/1 | /DISK1/APP/GEN/APP3/APP3 | GENERAL | YES | 1.0 | 1.2 |
| SCAN | STOP | 1.10 | 2002/3/12 | /DISK1/APP/GEN/SCAN/SCAN | GENERAL | YES | 1.0 | 1.2 |
| APP 4 | START | 2.1 | 2002/3/14 | /DISK1/APP/GEN/APP4/APP4 | SYSTEM | NO | 1.0 | 1.2 |
| | | | | | | | | |

1101 1102 1103 1104 1105 1106 1107 1108 1109

PROGRAM STORABLE IMAGE FORMING APPARATUS, CONTROL METHOD, AND CONTROL PROGRAM

BACKGROUND OF THE INVENTION

1. Field of the Invention

The present invention relates to an image forming apparatus having a function of a printer, a scanner, a facsimile apparatus, a copier or the like, or a composite apparatus of these apparatuses, and a control method and a control program for the image forming apparatus.

2. Description of the Related Art

Conventionally, in an image forming apparatus and control for the image forming apparatus, it is mainly constructed a system in an execution environment realized by a real-time OS (operating system), having high dependency on an architecture for a built-in system, that is different from a general-purpose OS mounted in a PC (personal computer).

On the other hand, as disclosed in Japanese Patent Application Laid-Open (Kokai) No. 2001-249814 (2001), it is being tried to construct another execution environment for a built-in system, such as Java (registered trade name) or the like, in the above-described real-time OS, and downloading and mounting an application module having high portability for performing, though limited, simple control of a copier.

However, conventional approaches have the following problems. That is, for example, in an image forming apparatus and a control method for the image forming apparatus constructed by a single real-time OS, portability of software of a built-in system is inferior. Accordingly, if modification or the like of only an application module for controlling the image forming apparatus within the image forming apparatus is generated, the entire system must be updated together with an engine control module and the like for which modification is unnecessary. As a result, the operation is inefficient, because, for example, a serviceman or the like must update the system using a special stool or the like.

As described above, aiming at a development environment having high portability, a system is being developed in which another execution environment is constructed in a real-time OS. However, such an approach has insufficient functions such that, for example, an application module in another execution environment cannot access the module in the real-time OS via an internal interface, complicated processing equivalent to the application module in the real-time OS cannot be flexibly performed, and an interface different from an interface for controlling an apparatus of the system must be used in the same apparatus, and has problems in that, for example, formation of application software is complicated.

In conventional management of an application module itself, only functions of downloading and erasing the application module are mounted, and it is impossible to perform settings of, for example, extracting and analyzing an application module causing a problem using an uploading function, and prohibiting execution of a downloaded application module. Other problems are such that, for example, meaningless downloading is performed for application software requiring a function that is not supported by the image forming apparatus, and each OS scrambles for a memory resource or the like within the image forming apparatus, resulting in incapability of performing an efficient operation because a necessary resource is not obtained when performing minimum necessary processing.

SUMMARY OF THE INVENTION

The present invention has been made in consideration of the above-described problems.

It is an aspect of the present invention to provide, in an image forming apparatus capable of executing various types of application software and control programs, a scheme to improve the development efficiency of the application software and the control programs.

It is another aspect of the present invention to provide, when constructing a second execution environment in a first execution environment within an image forming apparatus, an environment having high portability of a program in the second environment and having flexibility capable of easily controlling various functions of the image forming apparatus, by providing a scheme to utilize functions provided in the first execution environment from the second execution environment.

It is still another aspect of the present invention to provide a scheme capable of utilizing development resources executable in another execution environment that have been developed in order to control an image forming apparatus, from an execution environment having high portability.

According to one aspect of the present invention, an image forming apparatus having a first execution environment that can interpret and execute a first-format instruction for controlling the image forming apparatus, and a second execution environment that can interpret and execute a second-format instruction defined by a format that does not depend on a type of the image forming apparatus, realized in the first execution environment includes a control unit for controlling processing of starting the first-format instruction from the second execution environment, using a second-format predetermined instruction, a recognition unit for recognizing, when interpreting the second-format instruction by executing application software in the second execution environment, whether or not an instruction string to be executed is the second-format predetermined instruction, and a control unit for controlling the image forming apparatus by starting and executing the first-format instruction via the second-format predetermined instruction when the recognition unit has recognized that the instruction to be executed is the second-format predetermined instruction, and for controlling the image forming apparatus so as to execute the second-format predetermined instruction in the second execution environment when the recognition means has recognized that the instruction to be executed is not the second-format predetermined instruction.

According to another aspect of the present invention, a method in an image forming apparatus having a first execution environment that can interpret and execute a first-format instruction for controlling the image forming apparatus, and a second execution environment that can interpret and execute a second-format instruction defined by a format that does not depend on a type of the image forming apparatus, realized in the first execution environment includes a control step of controlling processing of starting the first-format instruction from the second execution environment, using a second-format predetermined instruction, and a recognition step of recognizing, when interpreting the second-format instruction by executing application software in the second execution environment, whether or not an instruction string to be executed is the second-format predetermined instruction. The image forming apparatus is controlled by starting and executing the first-format instruction via the second-format predetermined instruction when it has been recognized in the recognition step that the instruction to be executed is the second-format predetermined instruction, and the image forming apparatus is controlled so as to execute the second-format predetermined instruction in the second execution environment when it has been recognized in the recognition step that the instruction to be executed is not the second-format predetermined instruction.

According to still another aspect of the present invention, in a computer readable storage medium storing a control program to be executed in an image forming apparatus having a first execution environment that can interpret and execute a first-format instruction for controlling the image forming apparatus, and a second execution environment that can interpret and execute a second-format instruction defined by a format that does not depend on a type of the image forming apparatus, realized in the first execution environment, the control program causes a CPU (central processing unit) to execute the following steps including a control step of controlling processing of starting the first-format instruction from the second execution environment, using a second-format predetermined instruction, a recognition step of recognizing, when interpreting the second-format instruction by executing application software in the second execution environment, whether or not an instruction string to be executed is the second-format predetermined instruction, and a control step of controlling the image forming apparatus by starting and executing the first-format instruction via the second-format predetermined instruction when, in the recognition step, it has been recognized that the instruction to be executed is the second-format predetermined instruction, and for controlling the image forming apparatus so as to execute the second-format predetermined instruction in the second execution environment when, in the recognition step, it has been recognized that the instruction to be executed is not the second-format predetermined instruction.

According to yet another aspect of the present invention, an image forming apparatus controlled by executing a program includes storage means for storing the program. The program includes a first execution environment, a control module for controlling an engine executed in the first execution environment, a first interface for accessing the control module, a second execution environment, and a second interface for accessing the control module in the first execution environment from the second execution environment.

According to yet a further aspect of the present invention, an image forming apparatus controlled by executing a program includes storage means for storing the program. The program includes a first execution environment, a control module for controlling an engine executed in the first execution environment, a first application module executed in the first execution environment for causing the engine to perform processing by controlling the engine, a plurality of second application modules, having a first interface for causing the first application module to access the control module, and a second execution environment, executed in the second execution environment, and a second interface for causing the second application modules to access the control module in the first execution environment.

Other features and advantages of the present invention will be apparent from the following description taken in conjunction with the accompanying drawings, in which like reference characters designate the same or similar throughout parts thereof.

BRIEF DESCRIPTION OF THE DRAWINGS

FIGS. 6 and 7 are diagrams, each illustrating a picture frame shown on a display unit of an operation unit 500 shown in FIG. 1;

FIG. 8 is a diagram illustrating an operation picture frame of application-software managing software 308 shown in FIG. 3, serving as a preferred example of application managing means;

FIG. 9 is a diagram illustrating an application-software downloading picture frame of the application-software managing software 308;

FIG. 10 is a diagram illustrating an application-software uploading picture frame of the application-software managing software 308;

FIG. 11 is a diagram illustrating application-software information managed by the application-software managing software 308;

DETAILED DESCRIPTION OF THE PREFERRED EMBODIMENT

A first preferred embodiment of the present invention will now be described with reference to the drawings.

Figure 1:
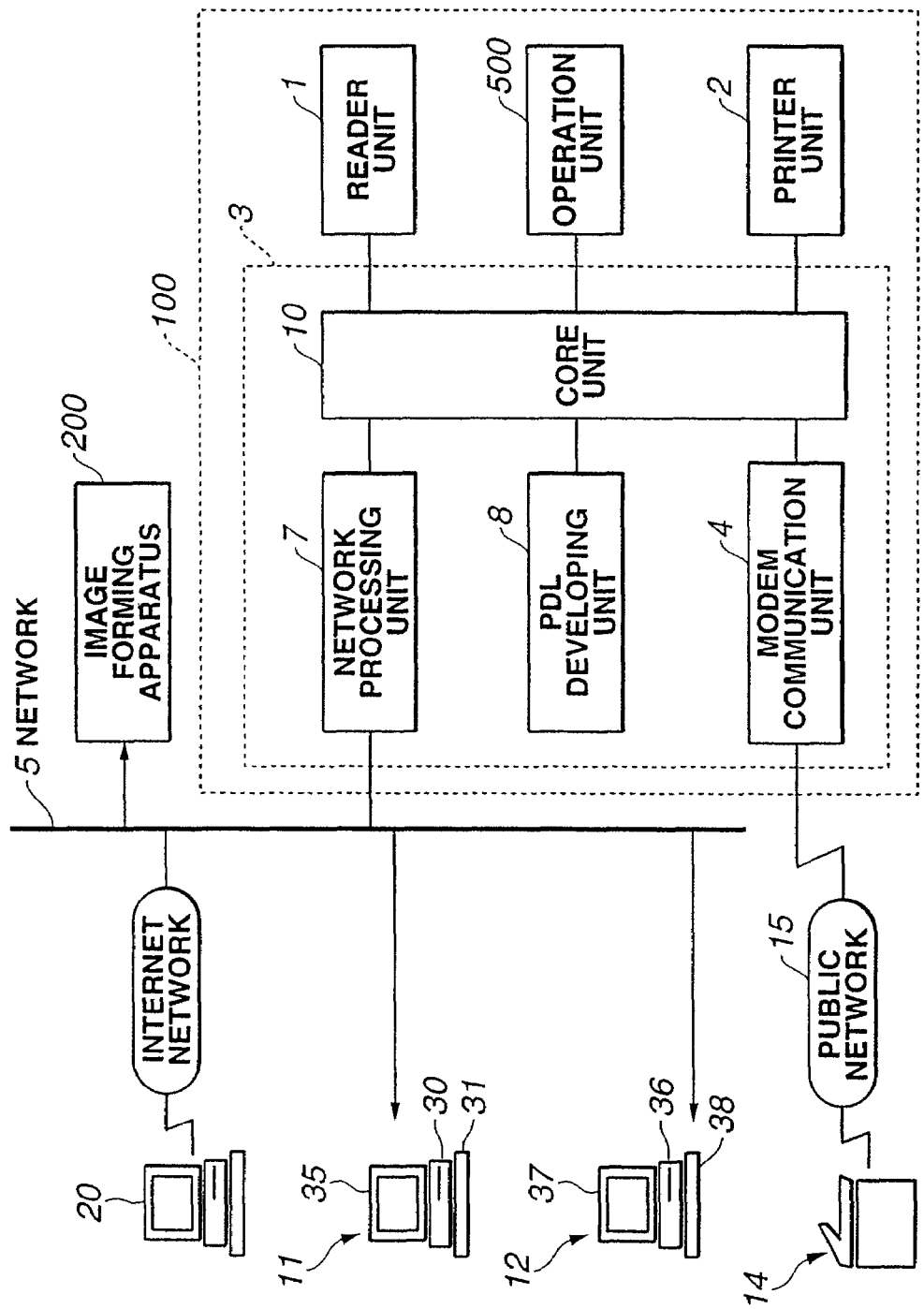
FIG. 1 is a block diagram illustrating a system including a copier, another image forming apparatus, and computers.

FIG. 1 is a block diagram illustrating a system including a copier, another image forming apparatus and computers, and illustrates the relationship among copiers, each serving as a preferred example of an image forming apparatus (image processing apparatus) of the present invention, information processing apparatuses (computers) and peripheral apparatuses. Each of image forming apparatuses 100 and 200 includes a reader unit 1, a printer unit 2, a controller unit 3 that includes a modem communication unit 4, a network processing unit 7, a PDL (process design language) developing unit 8, and core unit 10. A work station or a standard PC may used as the computer.

The reader unit 1 reads an image of an original set on the image forming apparatus, and outputs image data corresponding to the original-image to the printer unit 2 via the core unit 10. The printer unit 2 records an image corresponding to the image data from the reader unit 1 on a recording sheet.

Each of computers 11 and 12 is an example of an information processing apparatus, and comprises a personal computer or a work station (PC/WS). PDL print data is transmitted from each of the computers 11 and 12 to the core unit 10 via a network 5 and the network processing unit 7. The PDL developing unit 8 develops the PDL data into image data that can be recorded by the printer unit 2. The image data is printed by the printer unit 2 after passing through the core unit 10.

A facsimile apparatus 14 performs, for example, facsimile transmission of the original-image read by the reader unit 1 via the core unit 10, the modem communication unit 4 and a public network 15. Image data from another facsimile apparatus is received via the public network 15, the modem communication unit 4 and the core unit 10, and an image corresponding to the received image data is printed by the printer unit (printer-engine unit) 2.

Each of hard disks 30 and 36 within the computers 11 and 12, respectively, is an example of storage means of the information processing apparatus of the invention. Each of display devices 35 and 37 within the computers 11 and 12, respectively, is, for example, an LCD (liquid-crystal display). Each of input devices 31 and 38 of the computers 11 and 12, respectively, is a keyboard. The configuration shown in FIG. 1 is only an example. The present invention is not limited to the configuration shown in FIG. 1.

Figure 2:
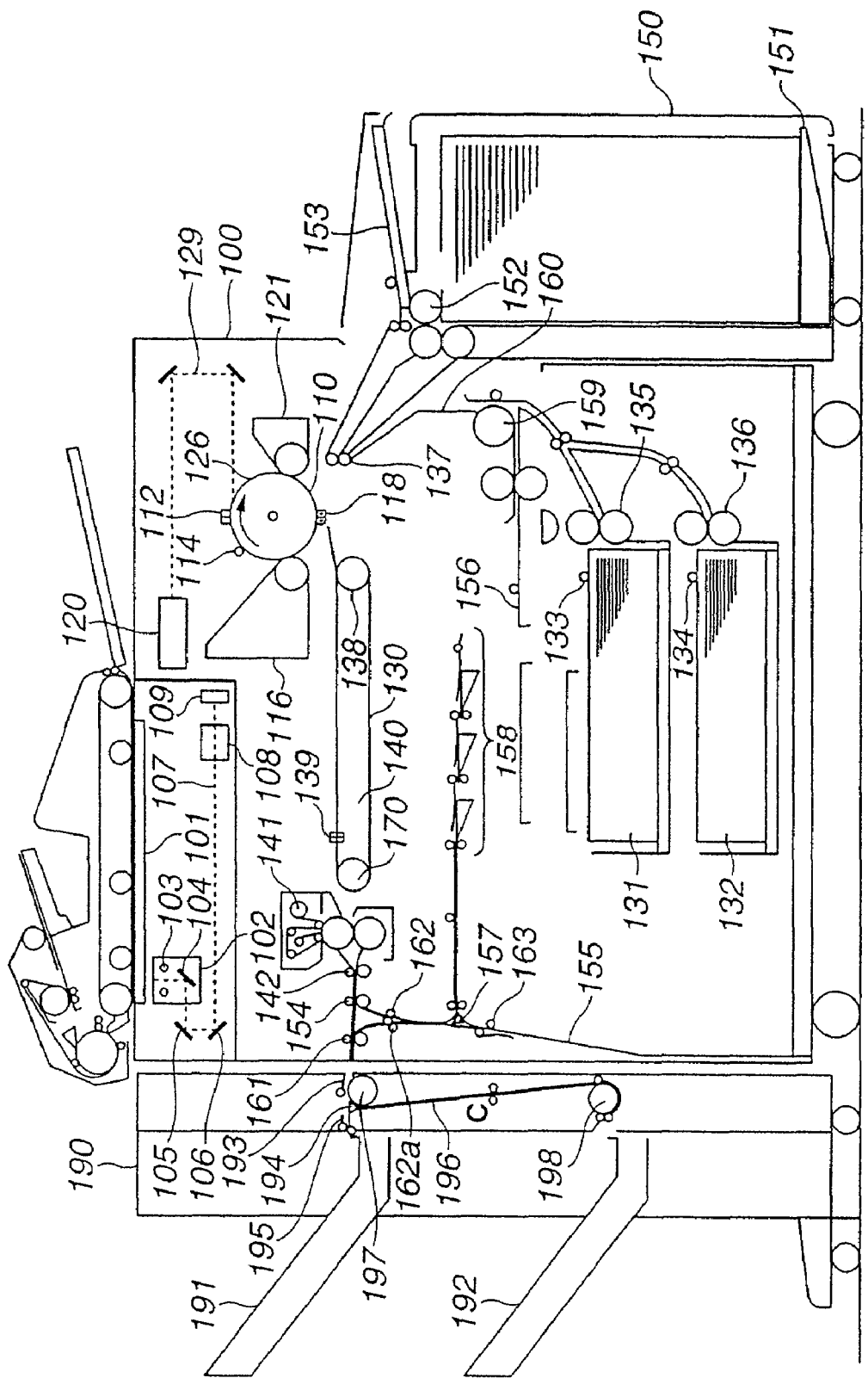
FIG. 2 is a cross-sectional view illustrating an image forming apparatus main body 100 shown in FIG. 1.

FIG. 2 is a cross-sectional view illustrating the copier main body 100 suitable for an image forming apparatus according to the present invention. An example of an image forming apparatus is a printer, a scanner or a facsimile apparatus. As an example of control of the image forming apparatus, a predetermined storage region within a HDD (hard-disk drive) possessed by a copier is provided as a box, and image data within the box may be operated. The image forming apparatus of the invention grossly includes the image forming apparatus main body (copier main body) 100, a deck 150, and a circulating automatic original-feeding apparatus (RDF) 180.

The image forming apparatus main body 100 includes platen glass 101, a scanner 102, scanning mirrors 105 and 106, a lens 108, a CCD (charge-coupled device) sensor (image sensing unit) 109, a photosensitive drum 110, a primary charger 112, a pre-exposure lamp 114, a cleaning device 116, a transfer charger 118, an exposure control unit 120, a developing unit 121, a transfer belt 130, an upper cassette 131, a lower cassette 132, pickup rollers 133 and 134, sheet feeding rollers 135 and 136, registration rollers 137, an attraction charger 138, a transfer-belt roller 170, pre-fixing chargers 139 and 140, a fixing unit 141, a sheet discharge roller 142, a sheet discharge flapper 154, an inversion path 155, a sheet refeeding tray 156, a multiplex flapper 157, a conveying path 158, a sheet feeding roller 159, a path 160, a discharge roller 161, a first feeding roller 162, a second feeding roller 162*a*, and an inversion roller 163. In this configuration, the reader unit 1 shown in FIG. 1 corresponds to a portion from the platen glass 101 to the CCD sensor 109, and the printer unit 2 shown in FIG. 1 corresponds to a portion from the photosensitive drum 110 to the inversion roller 163.

First, the reader unit 1 will be described in detail. The platen glass 101 is an original-mount. The scanner 102 includes an original-illuminating lamp 103, a scanning mirror 104 and the like. By being subjected to reciprocating scanning in a predetermined direction by a motor (not shown), the scanner 102 causes reflected light 107 from an original to pass through the lens 108 via scanning mirrors 104-106 and to be focused onto the CCD sensor 109. The reflected light is converted into an electrical signal by the CCD sensor 109. The electrical signal is subjected to A/D (analog-to-digital) conversion and shading correction by a scanner-image processing unit (not shown) provided near the CCD sensor 109, and is stored in a memory 324 as digital image data via a gate array 326 of the core unit 10 (to be described later).

Next, the printer unit 2 will be described in detail. The exposure control unit 120 includes a laser, a polygonal scanner and the like. The exposure control unit 120 reads the digital image data stored in the memory 324 of the core unit 10. The gate array 326 of the core unit 10 converts the digital image data into a video signal, and transmits the video signal to the printer unit 2 via an I/F (interface) 325. A laser beam 129 modulated based on the video signal is projected onto the photosensitive drum 110. The primary charger 112, the developing unit 121, the transfer charger 118, the cleaning unit 116, the pre-exposure lamp 114 are disposed around the photosensitive drum 110. In an image forming unit 126 including the photosensitive drum 110 as a main component, the photosensitive drum 110 is rotated in the direction of an arrow shown in FIG. 2 by a motor (not shown), and the surface of the photosensitive drum 110 is charged to a desired potential by the primary charger 112. Then, the laser beam 129 from the exposure control unit 120 is projected onto the photosensitive drum 110, to form an electrostatic latent image.

A transfer sheet fed from the upper cassette 131 or the lower cassette 132 by the pickup roller 133 or 134 is fed to the main body by the sheet feeding rollers 135 or 136, respectively, is further fed to the transfer belt 130 by the registration rollers 137, and a visualized toner image is transferred onto the transfer sheet by the transfer charger 118. Toner particles remaining on the photosensitive drum 110 after the image transfer are cleaned by the cleaning unit 116, and remaining charges are removed by the pre-exposure lamp 114. The transfer sheet after the image transfer is separated from the transfer belt 130, and toner particles are recharged by the pre-fixing chargers 139 and 140. Then, the transfer sheet is fed to the fixing unit 141 where the toner image is fixed by pressure and heat, and is discharged outside of the main body 100 by the sheet discharge roller 142.

The attraction charger 138 attracts the transfer sheet fed from the registration rollers 137 onto the transfer belt 130. The transfer-belt roller 170 is used for rotating the transfer belt 130, and for attracting the transfer sheet onto the transfer belt 130 in cooperation with the attraction charger 138.

The image forming apparatus main body 100 also includes the deck 150 that can accommodate, for example, 4,000 transfer sheets. A lifter 151 of the deck 150 raises in accordance with the amount of transfer sheets so that transfer sheets always contact the sheet feeding roller 152. The image forming apparatus main body 100 also includes a multiple-sheet manual insertion unit 153 that can accommodate, for example, 100 transfer sheets.

The sheet discharge flapper 154 switches the sheet path between a duplex recording side or a multiplex recording side, and a sheet discharge side. The transfer sheet fed from the sheet discharge roller 142 is switched to the duplex recording side or the multiplex recording side by the sheet discharge flapper 154. The multiplex flapper 157 performs switching between a duplex-recording path and a multiplex-recording path. By turning the multiplex flapper 157 to the left, the transfer sheet is directly guided to the conveying path 158 without passing through the inversion path 155. The sheet feeding roller 159 feeds the transfer sheet to the photosensitive drum 110 via the path 160.

The discharge roller 161 is disposed near the sheet discharge flapper 154. The sheet discharge flapper 154 discharges the transfer sheet switched to a sheet discharge side, outside of the apparatus. During duplex recording (or duplex copying), the multiplex flapper 157 is turned to the right by raising the sheet discharge flapper 154 to feed the transfer sheet, on which recording (copying) has been performed, through the inversion path 155. Then, the multiplex flapper 157 is turned to the left, and the transfer sheet is stored on the sheet refeeding tray 156 in a state in which the transfer sheet is inverted, via the conveying path 158. Transfer sheets stored in the sheet refeeding tray 156 are individually guided, from the lowest sheet, to the registration rollers 137 of the main body via the path 160 by the sheet feeding roller 159.

When discharging the transfer sheet from the main body in an inverted state, the sheet discharge flapper 154 is raised, the multiplex flapper 157 is turned to the right, and the transfer sheet on which recording (copying) has been performed is conveyed to the conveying path 155. After passage of the trailing edge of the transfer sheet through the first feeding roller 162, the transfer sheet is conveyed to the second feeding roller 162a by the inversion roller 163, and is discharged outside of the apparatus in a state in which the transfer sheet is inverted by the discharge roller 161. The transfer sheet discharged outside of the apparatus is conveyed to a finisher 190.

The finisher 190 stacks transfer sheets on which printing has been performed by the image forming apparatus 100. A path 193 receives transfer sheets on which printing has been performed by the image forming apparatus 100. A roller 197 feeds the transfer sheet conveyed from the path 193 to a path 195 or a path 196. In order to feed the transfer sheet to the path 195, the sheet discharge flapper 194 is moved downward. In order to feed the transfer sheet to the path 196, the sheet discharge flapper 194 is moved upward. When the transfer sheet passes through the path 196, the transfer sheet is discharged onto a bin 192 by a roller 198. When the transfer sheet passes through the path 195, the transfer sheet is discharged onto a bin 191. For example, by discharging the transfer sheet onto the bin 191 when a copying operation has been performed, and discharging the transfer sheet onto the bin 192 when a PDL printing operation has been performed, usability of the apparatus by the user is improved.

Figure 17:
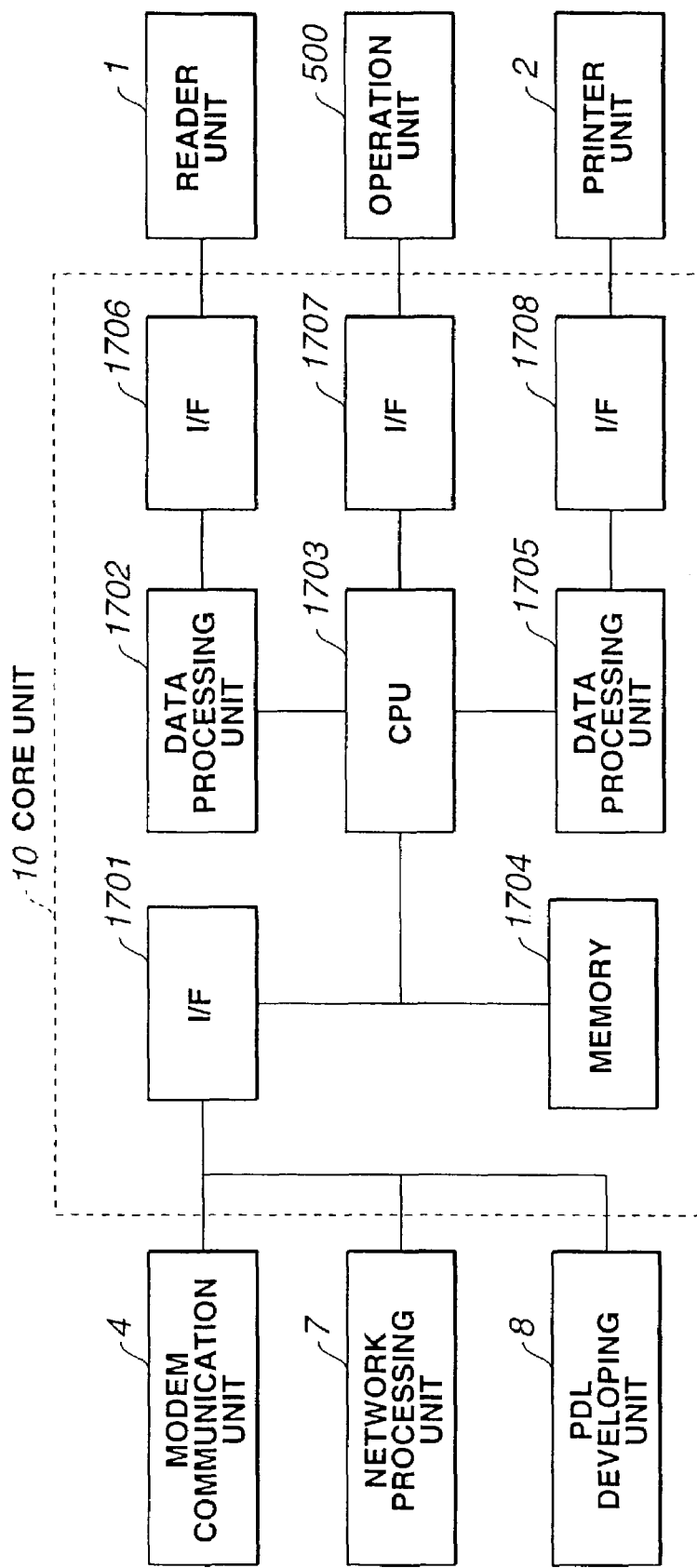
FIG. 17 is a block diagram illustrating the configuration of the core unit 10.

FIG. 17 is a block diagram illustrating the configuration of the core unit 10 of the image forming apparatus of the invention. The core unit 10 includes interface units (I/F's) 1701, 1706, 1707 and 1708, data processing units 1702 and 1705, a CPU (central processing unit) (control means) 1703, and a memory (storage means) 1704.

In the above-described configuration, image data from the reader unit 1 is transferred to the data processing unit 1702 via the I/F 1706. The data processing unit 1702 performs image processing, such as image rotation processing, magnification varying processing or the like. The image data transferred to the data processing unit 1702 is stored in the memory 1704 via the CPU 1703 as digital image data. The image data is also transferred to the printer unit 2 via the CPU 1703, the data processing unit 1705 and the I/F 1708, in accordance with a control command from an operation unit 500, serving as a preferable example of a display unit of the invention. The image data is also transferred to the modem processing unit 4 and the network processing unit 7 via the I/F 1701. The operation unit 500 comprises, for example, a liquid-crystal panel. The liquid-crystal panel has a touch-panel function in which key selection corresponding to a predetermined instruction or setting is realized by touching the panel with a finger.

Code data representing an image input via the network processing unit 7 is transferred to the CPU 1703 via the I/F 1701. When the CPU 1703 determines that the code data represents a PDL code, the PDL code is transferred to the PDL developing unit 8 via the I/F 1701. The PDL developing unit 8 develops the PDL code into image bit-map data. The image bit-map data is stored in the memory 1704 via the I/F 1701 and the CPU 1703. Then, the image bit-map data is transferred to the printer unit 2 via the CPU 1703, the data processing unit 1705 and the I/F 1708, to be subjected to printing.

Facsimile image data from the modem processing unit 4 is transferred to the data processing unit 1705 via the I/F 1701 and the CPU 1703, and is then transferred to the printer unit 2 via the I/F 1708.

The CPU 1703 performs the above-described control in accordance with control programs stored in the memory 1704, and control commands received from the operation unit 500 via the I/F 1707. The memory 1704 is also used as an operation region for the CPU 1703. As described above, this image forming apparatus can perform processing combining the functions of reading of an original-image, printing of an image, transmission/reception of an image, storage of an image, input/output of data from a computer, and the like, mainly at the core unit 10 of the control unit 3. The interface unit (I/F) 1701, serving as a preferable example of input means of the present invention, can download various types of application software and control programs from a server on an external network or another image forming apparatus, and store the downloaded data in the memory 1704. A detachable memory slot (not shown) may be considered as another preferable example of input means. It is possible to download a program not only from a network, but also from a flexible disk or an IC (integrated circuit) card connected to the memory slot, or a portable storage medium, such as a DVD (digital versatile disc), a CD(compact disc)-ROM (read-only memory) or the like, and store the program in the memory 1704.

Figure 3:
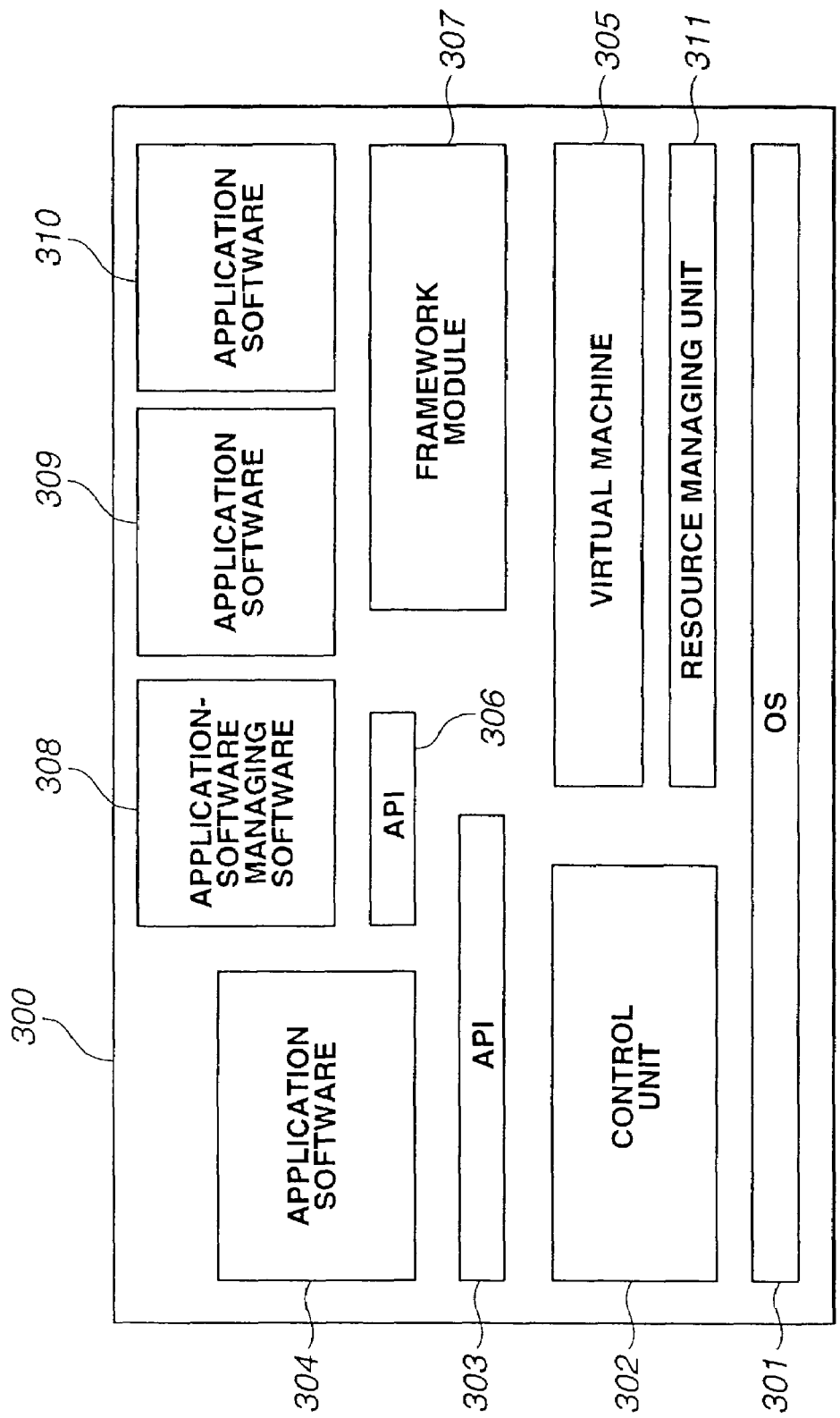
FIG. 3 is a block diagram illustrating a core unit 10 shown in FIG. 1.

FIG. 3 is a diagram illustrating the configuration of software 300 stored in the core unit 10 of the composite apparatus 100, serving as an example of an image forming apparatus according to the present invention.

In FIG. 3, reference numeral 301 represents a first execution environment of the present invention for controlling the entire image forming apparatus. The first execution environment 301 is generally respective modules of a real-time OS that can control respective functions of the copier in a real time, or a group of libraries capable of critically controlling respective functions, including optional devices and expansion cards, of the copier by instructing the CPU, and is realized by a group of modules for supplying application software operating at a higher hierarchy with interface commands. A control unit 302 operates in the first execution environment 301, and includes modules for controlling the reader unit 1, the printer unit 4, the modem communication unit 4, the PDL developing unit 8 and the like.

An application programming interface (hereinafter abbreviated as an "API") 303 has the functions of performing processing for accessing the control unit 302, and transmitting control commands to the composite apparatus 200 or the like via the network processing unit 7 and the network 5, in response to a command string input from application software. Application software 304 operates in the first execution environment 301, and asks various types of processing to the control unit 302 using the API 303. The application software 304 can also communicate with computers (information processing apparatuses) 11, 12 and 20 on the network 5 via the network processing unit 7.

Reference numeral 305 represents a second execution environment that is most suitable for executing specific application software. The second execution environment 305 is realized by a Java virtual machine, or the like. An API 306 is for access of application software in the second execution environment 305 to the control unit 302 operating in the real-time OS 301, serving as the first execution environment. In the first embodiment, the API 306 has the function of a conversion module for calling the API 303, and the function of transmitting control commands to the image forming apparatus 200 or the like via the network processing unit 7 and the network 5.

A framework module 307 has the function of overall control of application software in the second execution environment 305. Reference numeral 308 represents application software for managing other application software in the second execution environment 305. The application software 308 performs downloading, uploading, erasure and invalidation of each of sets of application software 309 and 310 (to be described below) in cooperation with the framework module 307.

Each of the sets of application software 309 and 310 operates in the second execution environment 305, and asks the control unit 302 for various types of processing using the API 306. Each of the sets of application software 309 and 310 can also communicate with the information processing apparatuses 11, 12 and 20 on the network 5 via the network processing unit 7.

A resource managing unit 311 manages resources used by the second execution environment 305, and operates in the real-time OS for realizing the first execution environment. The resource managing unit 311 provides limitation so that resources more than predetermined ones cannot be used, when the virtual machine 305 itself for realizing the second execution environment, the API 306, the framework module 307, or each application software in the OS 305 uses resources, such as a memory and the like.

First, the API 303 will be described. The API 303 is a set of interfaces in the real-time OS 301 corresponding to a plurality of control commands for accessing the control unit 302 that is controlled by the real-time OS 301, serving as the first execution environment. Each of the interfaces corresponding to each of the control commands has a parameter for assigning an apparatus for which the control command is to be executed, and can assign the control unit 302 within the same apparatus and the control unit 302 of the image forming apparatus 200 connected via the network 5.

Figure 4:
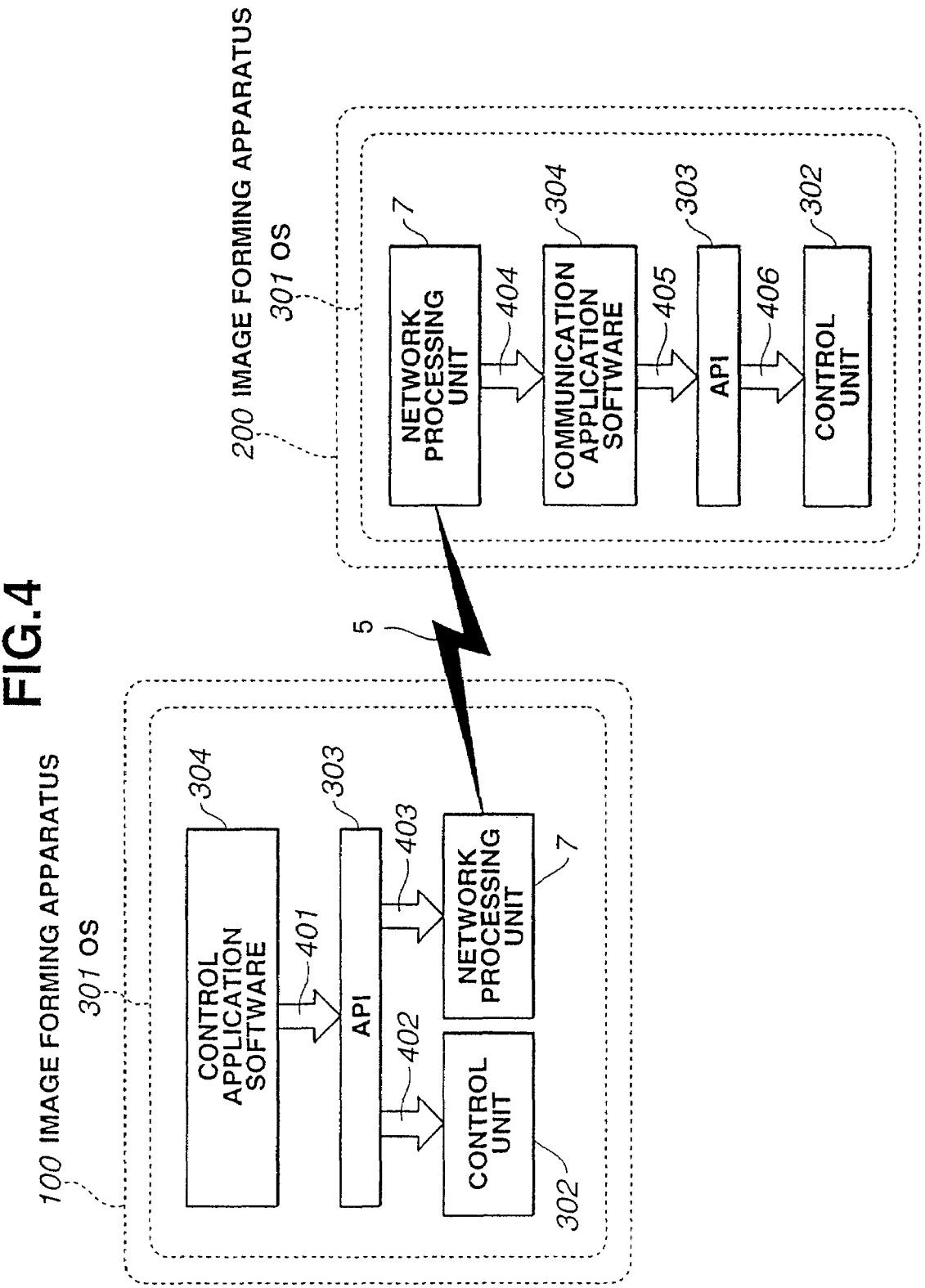
FIG. 4 is a block diagram illustrating a command calling operation using an API (application programming interface) 303 shown in FIG. 3.

FIG. 4 is a diagram illustrating an operation of calling an interface of the API 303. For example, conventionally, when a single real-time OS is mounted in the image forming apparatus, a group of interfaces conforming to a printing protocol capable of very finely controlling operations of the image forming apparatus in the real-time OS may be used as the API 303. In the first embodiment, the API 303 is a group of libraries for realizing a network printing protocol.

In the first embodiment, it is assumed that an interface A corresponding to a control command A is called. In this case, it is assumed that a command and an interface are in one-to-one correspondence. However, a combination of a plurality of commands may be considered as a new command that coffesponds to the interface A. The application software 304 calls the interface A of the API 303 (step 401). An identifier representing an image processing apparatus to be processed can be added to the interface A. The API 303 interprets the identifier added to the interface A. When it is determined that the apparatus indicated by the identifier is the image forming apparatus itself including the API 303, then, in step 402, corresponding processing is performed by executing the command A for the control unit 302. When it is determined that the object to be controlled by the command is an external apparatus (the image forming apparatus 200) using the identifier, then, in step 403, the API 303 transmits data of a packet format corresponding to the command of the network 5 via the network processing unit 7. The network processing unit (acquisition means) 7 of the image forming apparatus 200 acquires a command from the above-described data of the packet format, and transmits data of the command A to the communication application software 304. The communication application software 304 recognizes the interface A coffesponding to the command A, and in step 405, calls the interface A of the API 303 for the control unit 302 within the apparatus.

At that time, the interface A called in step 401 may be the same as the interface A called in step 405. Since an object to be processed by the command is within the apparatus, the API 303 performs processing corresponding to the command A for the control unit 302. At that time, the processing corresponding to the command in step 402 is the same as the processing corresponding to the command in step 406.

Figure 5:
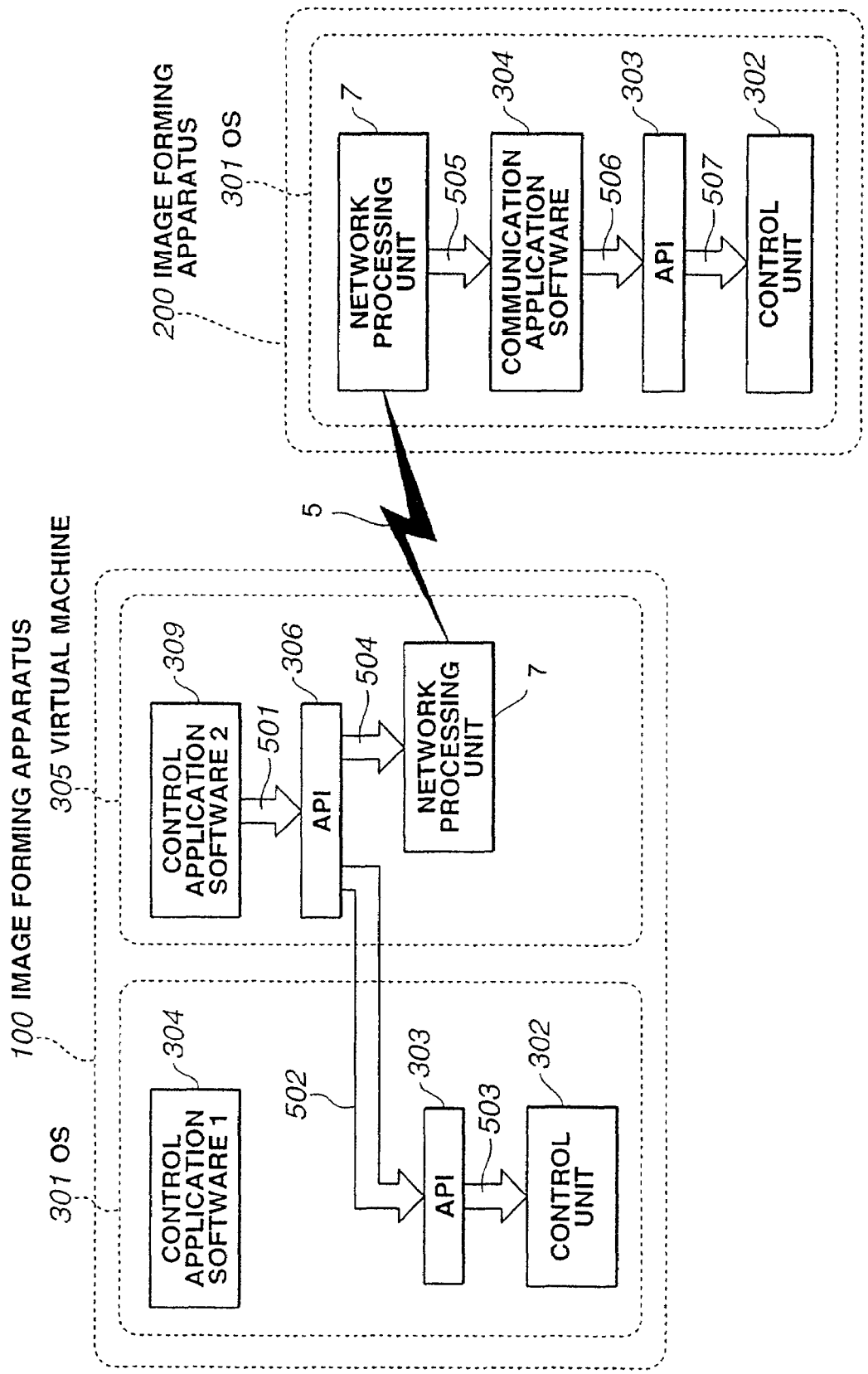
FIG. 5 is a block diagram illustrating the operation of an API 306 shown in FIG. 3.

FIG. 5 is a block diagram illustrating operations of the API 306. In the first embodiment, it is assumed that the interface A is called as the interface corresponding to the command A for finally instructing the image forming apparatus. In step 501, the control application software 2 309 calls the interface A of the API 306. Portions different from those in FIG. 4 will now be described in detail.

Each interface included in the API 306 is a preferable example of a second-format command of the invention. Each interface included in the API 303 is a preferable example of a first-format command of the invention.

First, the API 306 will be described in detail. The API 306 is a set of interfaces in the second execution environment 305, and includes an interface that can call an interface provided by the API 303. Each interface corresponding to each command of the API 306 has a parameter for assigning an object for which a control command is to be executed, as in the case of the API 303. The control unit 302 within the same apparatus or the control unit 302 of the image forming apparatus 200 connected to the network 5 can be assigned.

A case, in which the interface A for which the control command must be executed by being converted into the first execution environment is called, will now be considered. If an object for processing to be started by the called interface A is within the apparatus, an interface of the API 306 is called. When an interface of the API 306 has been called, an interface of the API 303 that can be interpreted by the real-time OS 301 is started and called. Then, the interface of the API 303 starts processing corresponding to the command A (step 502). The API 303 performs processing corresponding to the command A for the control unit 302 (step 503). If the object for which the command is to be executed is outside of the apparatus (for example, the image forming apparatus 200), a packet corresponding to the command of the network 5 is transmitted via the network processing unit 7 (step 504). The network processing unit 7 of the image forming apparatus 200 receives the transmitted packet, and transmits packet data coffesponding to the command A to the communication application software 304 (step 505). The communication application software 304 calls the interface A of the API 303 for the control unit 302 within the apparatus (step 506). At that time, the interface called in step 502 is the same as the interface A called in step 506.

As described above, it is possible to provide the API 306 which is a group of interfaces that does not depend on whether or not a function to be operated is within the image forming apparatus or within another image forming apparatus, a difference between the architectures of apparatuses, and a difference between OS's. By utilizing the API 306, it is possible to develop various types of application software only by studying the system of the API 306 of the execution environment 2, and call and utilize the API 303 without requiring overheads. Accordingly, it is possible to utilize various functions of the image forming apparatus if there exists the API 303, serving as development resources, when performing control.

Figure 18:
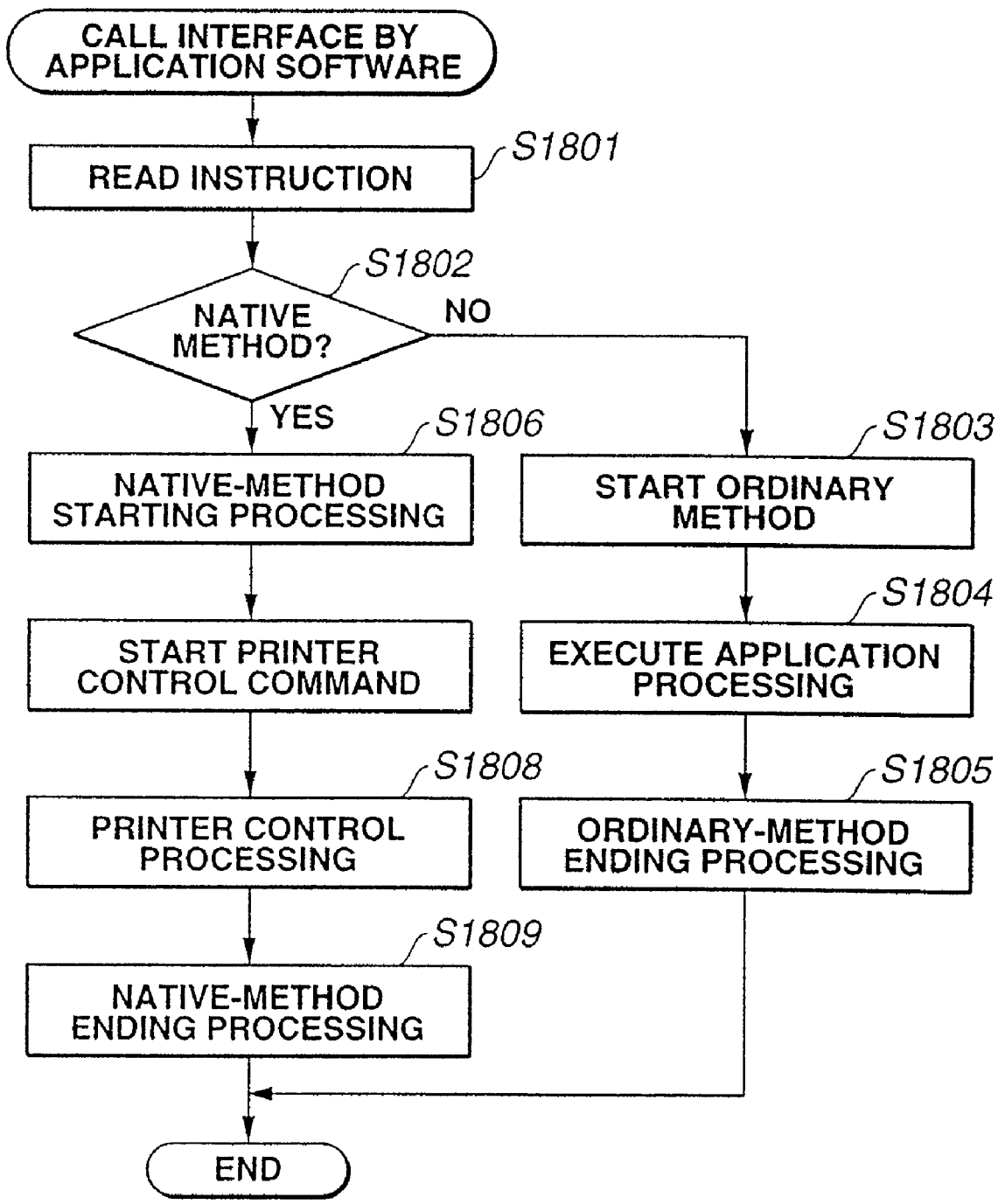
FIG. 18 is a flowchart illustrating an example of interface calling processing in a virtual machine 305 shown in FIG. 3.

Since an object to be processed by the command is within the apparatus, the API 306 performs processing corresponding to the command A for the control unit 302, in step 507. At that time, the processing corresponding to the command in step 503 is, of course, the same as the processing corresponding to the command in step 507. Of course, the processing from step 404 to step 406 is the same as the processing from step 505 to step 507, and the operation when using the API 303 is the same as the operation when using the API 306. shown in FIG. 18 is started. In step S1801, the interface called by the virtual FIG. 18 is a flowchart illustrating an example of interface calling processing in the virtual machine 305. First, in the virtual machine 305, serving as the second execution environment, application software is started in response to input from an external apparatus, an instruction from the operation unit, or the like. When a certain interface is called, processing shown in FIG. 18 is started. In step S1801, the interface called by the virtual machine 305 is read and recognized. Then, in step S1802, the virtual machine 305 determines whether or not the recognized interface is a native method, serving as a preferable example of a predetermined instruction of the second format that can be interpreted in the second execution environment. The native method is a method that calls a command of the first format of the invention, and that can be interpreted and executed by the real-time OS 301, serving as a preferable example of the first execution environment. If the result of the determination in step S1802 is negative, an ordinary method is started and called by determining that the ordinary method has been read. The ordinary method performs predetermined application processing (step S1804), and performs processing of terminating the ordinary method (step S1805), and terminates the process. If the result of the determination in step S1802 is affirmative, the process proceeds to step S1806, where the virtual machine 305 performs processing of starting the native method (step S1806), and calls (starts and executes) an engine control program, serving as a preferable example of a command string of the first format. This calling process indicates calling of a printer control command via an interface included in the API 303 shown in FIG. 5, and corresponds to the portion 503 shown in FIG. 5. Then, in step S1808, processing of controlling the printer is performed. Then, in step S1809, processing of terminating the native method is performed, and the process shown in FIG. 18 is terminated.

In the control of the engine unit, the control program to be executed in the first execution environment includes various controllers for controlling the engine unit, and, when a video controller unit, a DC controller unit and a network board are provided, also includes control commands for controlling the network board, and the contents of storage of the memory in the HDD (hard-disk drive) within the image forming apparatus.

For example, a program not requiring a critical response, such as an application module for realizing a graphical user interface of an operation panel of a copier or a printer by software, can be used as application software for calling processing of the ordinary method. A case of calling a printer-engine control program via, for example, a Java native-method interface for processing requiring a critical response for controlling an engine control unit (engine unit) for a copier, a printer or the like, from application software may be considered as a case of calling the native method.

Figure 6:
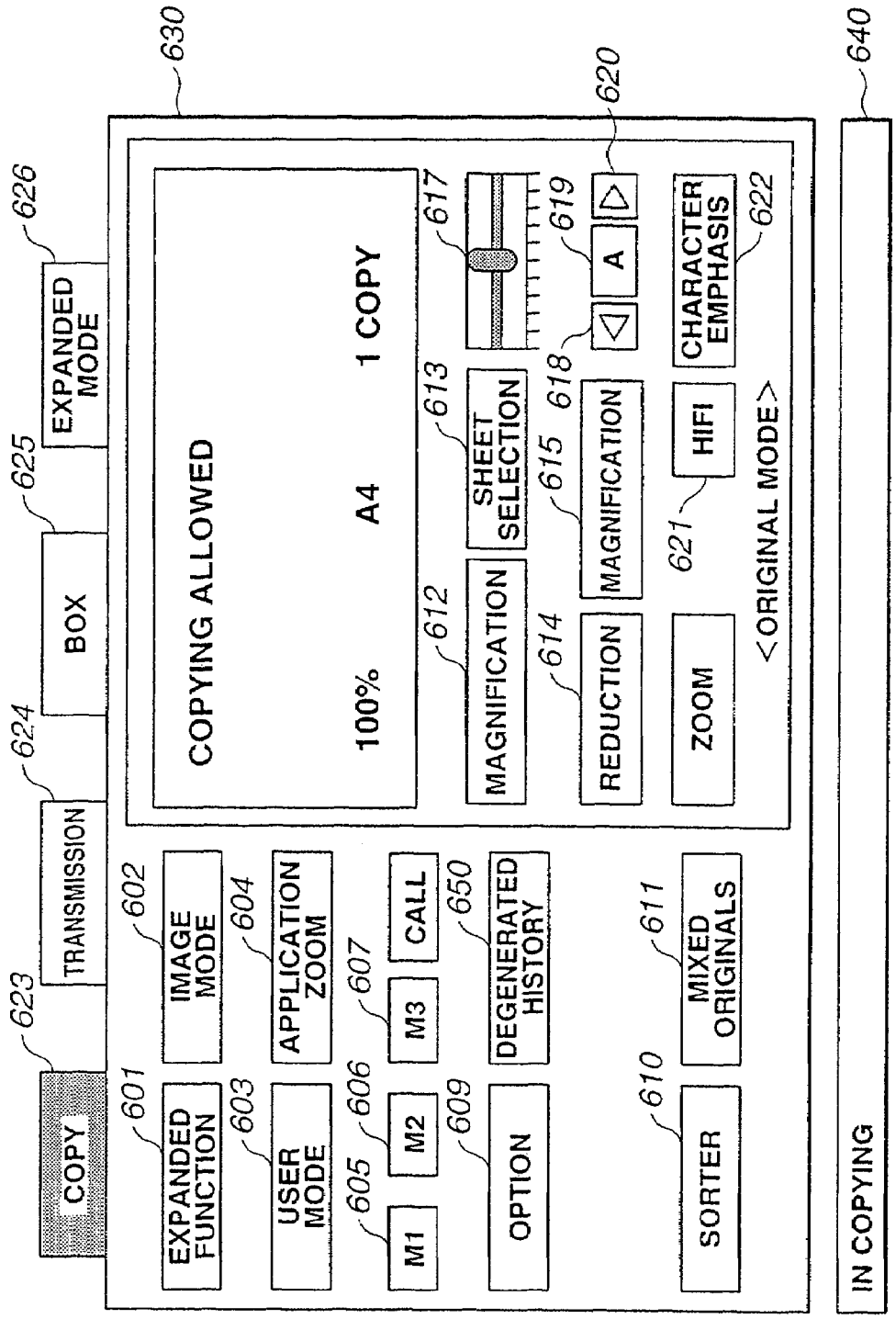

FIG. 6 is a diagram illustrating a picture frame displayed on a display unit of the operation unit 500 (see FIG. 1) of the image forming apparatus of the invention, for selecting and executing application software to be executed in the real-time OS 301, serving as an example of the first execution environment of the invention. This picture frame is in the form of a touch panel. By touching a portion within the frame of a displayed function, the function is executed.

A copy-mode key 623 is depressed when performing a copying operation. When the copy-mode key 623 has been displayed, a picture frame 630 indicating a copy mode shown in FIG. 6 is displayed. By depressing an expanded-function key 601, a mode of setting duplex copying, multiplex copying, movement, a binding margin, frame erasure and the like is provided.

An image-mode key 602 is for providing a setting mode for performing half-tone dot meshing, shadowing, trimming or masking for a copied image.

A user-mode key 603 is for registering a mode memory or setting a standard-mode picture frame.

An application-zoom key 604 is a mode of independently setting magnifications in the x-direction and the y-direction of an original, and a zoom-program mode of calculating a magnification ratio from the sizes of an original and a copy. An M1 key 605, an M2 key 606 and an M3 key 607 are depressed when calling respective registered mode memories. An option key 609 is for setting an optional function, such as a film projector or the like, in order to perform direct copying from a film.

FIG. 18 is a flowchart illustrating an example of interface calling processing in the virtual machine 305. First, in the virtual machine 305, serving as the second execution environment, application software is started in response to input from an external apparatus, an instruction from the operation unit, or the like. When a certain interface is called, processing shown in FIG. 18 is started. In step S1801, the interface called by the virtual machine 305 is read and recognized. Then, in step S1802, the virtual machine 305 determines whether or not the recognized interface is a native method, serving as a preferable example of a predetermined instruction of the second format that can be interpreted in the second execution environment. The native method is a method that calls a command of the first format of the invention, and that can be interpreted and executed by the real-time OS 301, serving as a preferable example of the first execution environment. If the result of the determination in step S1802 is negative, an ordinary method is started and called by determining that the ordinary method has been read. The ordinary method performs predetermined application processing (step S1804), and performs processing of terminating the ordinary method (step S1805), and terminates the process. If the result of the determination in step S1802 is affirmative, the process proceeds to step S1806, where the virtual machine 305 performs processing of starting the native method (step S1806), and calls (starts and executes) an engine control program, serving as a preferable example of a command string of the first format. This calling process indicates calling of a printer control command via an interface included in the API 303 shown in FIG. 5, and corresponds to the portion 503 shown in FIG. 5. Then, in step S1808, processing of controlling the printer is performed. Then, in step S1809, processing of terminating the native method is performed, and the process shown in FIG. 18 is terminated.

A HiFi key 621 is depressed when copying an original having a high halftone density, such as a photograph original or the like. A character-emphasis key 622 is depressed when intending to emphasize characters in copying of a character original. A transmission-mode key 624 is depressed when performing facsimile transmission or the like. A box-mode key 625 is depressed when operating data stored in a box. The copying-mode key 623, the transmission-mode key 624 or the box-mode key 625 corresponds to an operation of selecting the application software 304 executed in the OS 301.

An expanded-mode key 626 is a mode key of the present invention, and is for shifting to a picture frame (see FIG. 7) for selecting and executing application software executed in the second execution environment 305 of the invention. Although in the first embodiment, the expanded-mode key 626 is displayed in the same manner as in selection of other mode keys, the expanded-mode key 626 may be displayed so as to be visually recognized more easily, for example, by changing the size or the design of the key.

A status line 640 displays a message indicating the state of the apparatus or printing information. In the case of FIG. 6, the status line 640 displays that a copying operation is being performed. By depressing a history key 650, history information of a job that has completed a printing operation is displayed. For example, information relating to the time of completion of printing, the user name, the file name, the number of copies, and the like are displayed.

When execution of a copying operation is instructed using a Start key (not shown) or the like while the copy-mode picture frame 630 is displayed, an interface for starting processing, an interface for setting various parameters, and the like are sequentially called for the API 303 (step 401). Usually, since a copying operation is instructed to the inside of the apparatus, a command is transmitted to the control unit 302 in the API 303 (step 402), and as a result, a copying operation is executed.

FIG. 7 is a diagram illustrating a picture frame displayed on the display unit of the operation unit 500 of the image forming apparatus shown in FIG. 1, for selecting and executing application software to be executed in the second execution environment 305 of the invention. This picture frame is in the form of a touch panel. By touching a portion within the frame of a displayed function, the function is executed. A simplified-copying-mode key 730 is depressed when performing a copying operation. When the simplified-copying-mode key 730 has been displayed, a simplified-copying picture frame 740 shown in FIG. 7 is displayed.

A display picture frame 701 corresponds to the current setting items. A summary of setting 702 displays the current setting items and the contents of the respective setting items. The current setting items are displayed so as to be visually recognized according to emphasis display or the like. In this embodiment, emphasis display is realized by thickening characters. However, any other appropriate display may be adopted provided that selected items can be easily identified. Reference numeral 703 represents the current setting of the number of copies. Reference numeral 704 represents the current setting of sheets.

Reference numeral 705 represents the current setting of Nup. Reference numeral 706 represents the current setting of duplex printing. Reference numeral 707 represents the current setting of sorting. Reference numeral 708 represents the current setting of stapling. A button 709 is used when returning to the contents of immediately preceding setting. When the button 709 is depressed, the display picture frame 701 is redisplayed in the contents corresponding to the set item. In the first embodiment, if the corresponding item is absent, the button 709 may be set in a non-displayed state. A button 710 is used when preceding to the contents of the next setting. When the button 710 is depressed, the display picture frame 701 is redisplayed in the contents corresponding to the set item. A status line 720 displays a message indicating the state of the apparatus or printing information. In the case of FIG. 7, the status line 720 displays that a copying operation is being performed.

Each of an App2-mode key 731 and an App3-mode key selects corresponding application software. An Original-mode key 733 is a mode key of the invention, and for shifting to a picture frame (see FIG. 6) for selecting and executing application software executed in the real-time OS 301, serving as an example of the first execution environment of the invention. Although in the first embodiment, the Original-mode key 733 is displayed in the same manner as other mode selection keys, this key may be displayed so as to be visually recognized more easily, for example, by changing the size or the design of the key. When execution of a copying operation is instructed using a Start key (not shown) or the like to the API 306 while the simplified copying mode picture frame 740 is displayed, an interface for starting processing, an interface for setting various parameters, and the like are sequentially called for the API 303 (step 501). Usually, since a copying operation is instructed to the inside of the apparatus, a corresponding interface of the API 303 is called (step 502). The API 303 transmits a command to the control unit 302 in the apparatus (step 503), and as a result, a copying operation is executed.

FIG. 11 is a diagram illustrating application information managed by the application-software managing software, in which each information is stored when downloading application software (to be described later), and is deleted when erasing the application software. Reference numeral 1101 represents the name of currently downloaded application software.

Reference numeral 1102 represents the current status of application software. "Start" indicates that the corresponding application software is currently being executed, and "Stop" indicates the corresponding application software is not executed. Reference numeral 1103 represents a version of application software. Reference numeral 1104 represents the date of download. Reference numeral 1105 represents the storing location of the downloaded application software. Reference numeral 1106 represents the type of application software. "General" indicates ordinarily used application software, and "System" indicates application software used for a special use.

Reference numeral 1107 represents whether or not a certain display is to be performed on a UI, i.e., the operation unit. "Yes" indicates that display is to be performed. Reference numeral 1108 represents a version of the framework module 307 necessary for executing application software. Reference numeral 1109 represents a version of the API 306 necessary for executing application software. Information held as application-software information is not limited to the above-described one. For example, information relating to the information processing apparatus serving as the source of downloading may be stored.

FIG. 8 is a diagram illustrating an operation picture frame of the application-software managing software 308, serving as a preferable example of application managing means of the invention. Since in the first embodiment, a removable storage medium cannot be directly connected to the image forming apparatus 100, downloading processing is performed from the storage device 30 or 36 of the information processing apparatus 11 or 12, respectively. Although in the first embodiment, application software is operated from the operation unit 500 of the image forming apparatus 100, the application software may also be operated from the information processing apparatus 11 or 12 on the network. Although in the first embodiment, a case in which the application-software managing software of the invention is executed in the OS 2, the application-software managing software may, or course, also be executed in the OS 1.

Reference numeral 804 represents a summary of sets of application software that are already downloaded. In the first embodiment, only sets of application software whose type 1106 shown in FIG. 11 is "general" are displayed. Reference numeral 802 represents the name of application software, in which the contents of the application-software name 1101 shown in FIG. 11 are displayed. Reference numeral 803 represents the current status of application software, in which the contents of the status 1102 shown in FIG. 11 are displayed.

Reference numeral 804 represents a version of application software, in which the contents of the version 1103 shown in FIG. 11 are displayed. Reference numeral 805 represents the date of download, in which the contents of the date 1104 shown in FIG. 11 are displayed. A "download" button 806 is selected when newly downloading application software. After the selection, the picture frame shifts to a downloading picture frame shown in FIG. 9 (to be described later). An "upload" button 807 is for selecting desired application software from the summary of sets of application software. By selecting this button, downloaded application software is uploaded in a predetermined information processing apparatus. After the selection, the picture frame shifts to an uploading picture frame shown in FIG. 10 (to be described later)

An "erase" button 808 is selected when erasing application software. Desired application software is selected from the summary of sets of application software. By selecting this button, application software is deleted from the image forming apparatus 100. By instructing start of predetermined application software to the framework module 307 using an application-software start button 809 of the invention, the application software being stopped is started.

By instructing stop of predetermined application software to the framework module 307 using an application-software stop button 810 of the invention, application software being started is stopped.

A mode key 820 is for selecting the application-software managing software of the invention.

A simplified-copying-mode key 821 is the same as the simplified-copying-mode key 730 shown in FIG. 7. Reference numeral 822 represents a App3-mode key. A status line 830 displays a message indicating the state of the apparatus or printing information. In the case of FIG. 8, the status line 830 displays that a copying operation is being performed. The contents displayed on the application-software summary 801 are not limited to the above-described ones. Furthermore, the order of display and the method of display are not particularly provided.

FIG. 9 is a diagram illustrating an application-software downloading picture frame of the application-software managing software. Since in this embodiment, a removable storage medium cannot be directly connected to the image forming apparatus 100, uploading processing is performed from the storage device 30 or 36 of the information processing apparatus 11 or 12, respectively. Although in the first embodiment, application software is operated from the operation unit 500 of the image forming apparatus 100, the application software may be operated from the information processing apparatus 11 or 12 on the network.

An input field 901 is for assigning application software to be downloaded. In the first embodiment, it is assumed that predetermined application software is downloaded from the information processing apparatus 11 connected via the network 5. A button 902 is for interrupting the processing of this picture frame and shifting to the picture frame shown in FIG. 8. A button 903 is for instructing start of a downloading operation. By depressing this button, the processing of a flowchart shown in FIG. 12 (to be described later) is executed.

The method for assigning application software to be downloaded is not limited to the method of the first embodiment. For example, a configuration may be adopted in which the information processing apparatuses 11, 12 and 20, and the like on the network 5 are visually arranged, the contents of the storage devices 30 and 36 within each information processing apparatus are visually displayed, and an object to be downloaded is selected.

Figure 12:
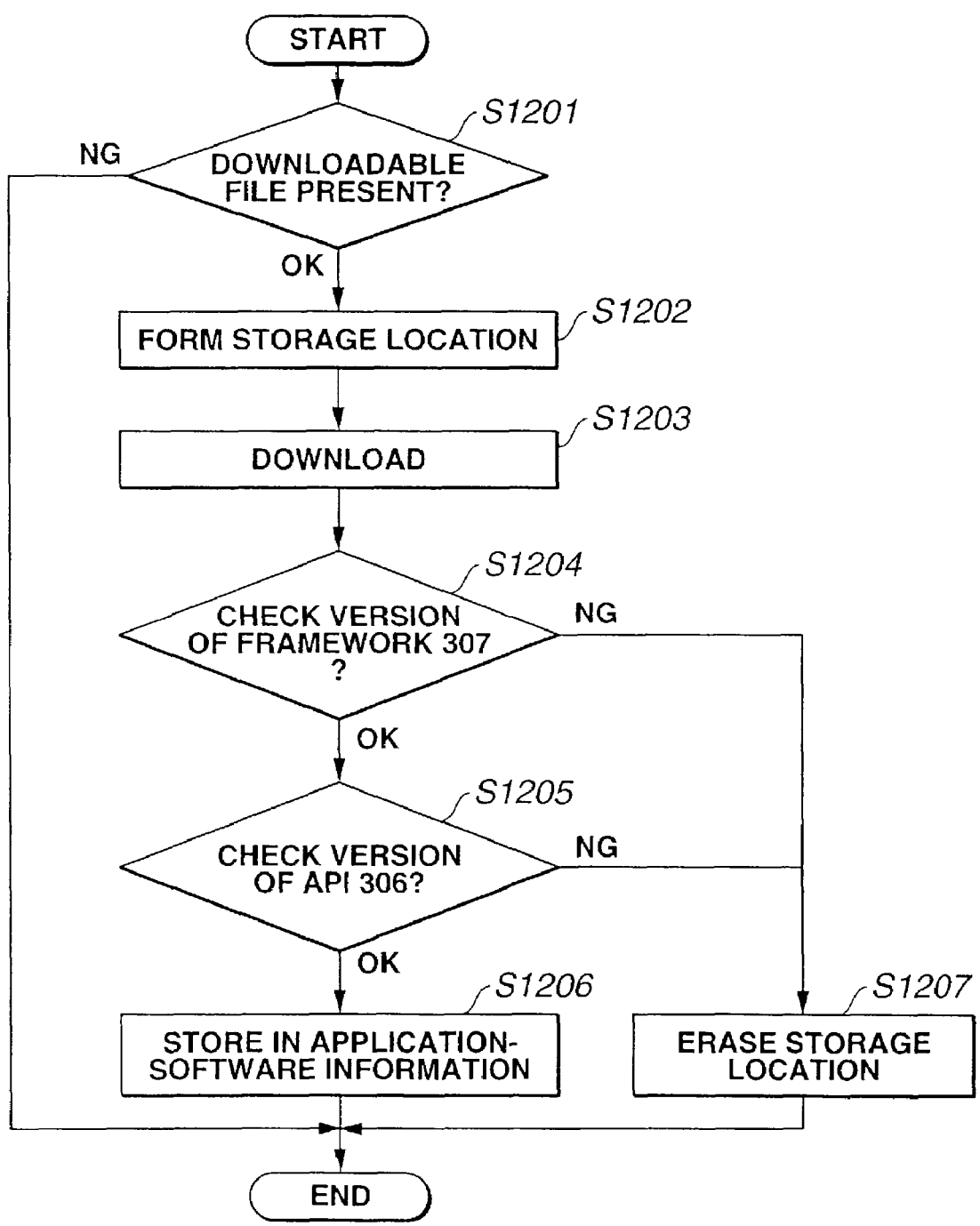
FIG. 12 is a flowchart when downloading the application-software managing software 308.

FIG. 12 is a flowchart illustrating processing performed when downloading the application-software managing software. In step S1201, it is determined whether or not information that can be downloaded at a predetermined position of the information processing apparatus 11 from data input in the input field 901. If the result of the determination in step S1201 is affirmative, the process proceeds to step S1202. If the result of the determination in step S1201 is negative, the process is terminated.

In step S1202, a location for storing the downloaded data is formed The data is stored in a predetermined position of the memory 1704. In step S1203, the data is downloaded. Predetermined data in the information processing apparatus 11 is downloaded in the field formed in step S1202. The data to be downloaded may be compressed by certain means, or comprises a plurality of files.

In step S1204, part of the downloaded data is analyzed, and a version of the framework module 307 from among information necessary for execution of the downloaded application software is checked. If the result of the check in step S1204 is OK, the process proceeds to step S1205. If the result of the check in step S1204 is NG, the process proceeds to step S1207. In step S1205, part of the downloaded data is analyzed, and a version of the API 306 from among information necessary for execution of the downloaded application software is checked. If the result of the check in step S1205 is OK, the process proceeds to step S1206. If the result of the check in step S1205 is NG, the process proceeds to step S1207.

In step S1206, the downloaded data is registered in the application information shown in FIG. 11 as operable application software.

In step S1207, since the downloaded data is determined as inoperable application software, it is deleted from the memory 1704.

FIG. 10 is a diagram illustrating an application-software uploading picture frame for the application-software managing software. A field 1001 indicates application software to be uploaded, in which application software selected in FIG. 8 is displayed. An input field 1002 is for assigning an information processing apparatus where the application software is to be uploaded. In the first embodiment, it is assumed that the application software is uploaded at a predetermined position of the information processing apparatus 12 connected via the network 5.

A button 1003 is for interrupting the processing of this picture frame, and shifting to the picture frame shown in FIG. 8. A button 1004 is for instructing start of an uploading operation. After confirming the location of uploading assigned in step S1002, all of the contents downloaded in the downloading step S1203 shown in FIG. 12 are uploaded. The method for assigning an information processing apparatus where data is to be uploaded is not limited to the method of the first embodiment. For example, a configuration may be adopted in which the information processing apparatuses 11, 12 and 20, and the like on the network 5 are visually arranged, the contents of the storage devices 30 and 36 within each information processing apparatus are visually displayed, and a location where data is to be uploaded is selected.

Figure 13:
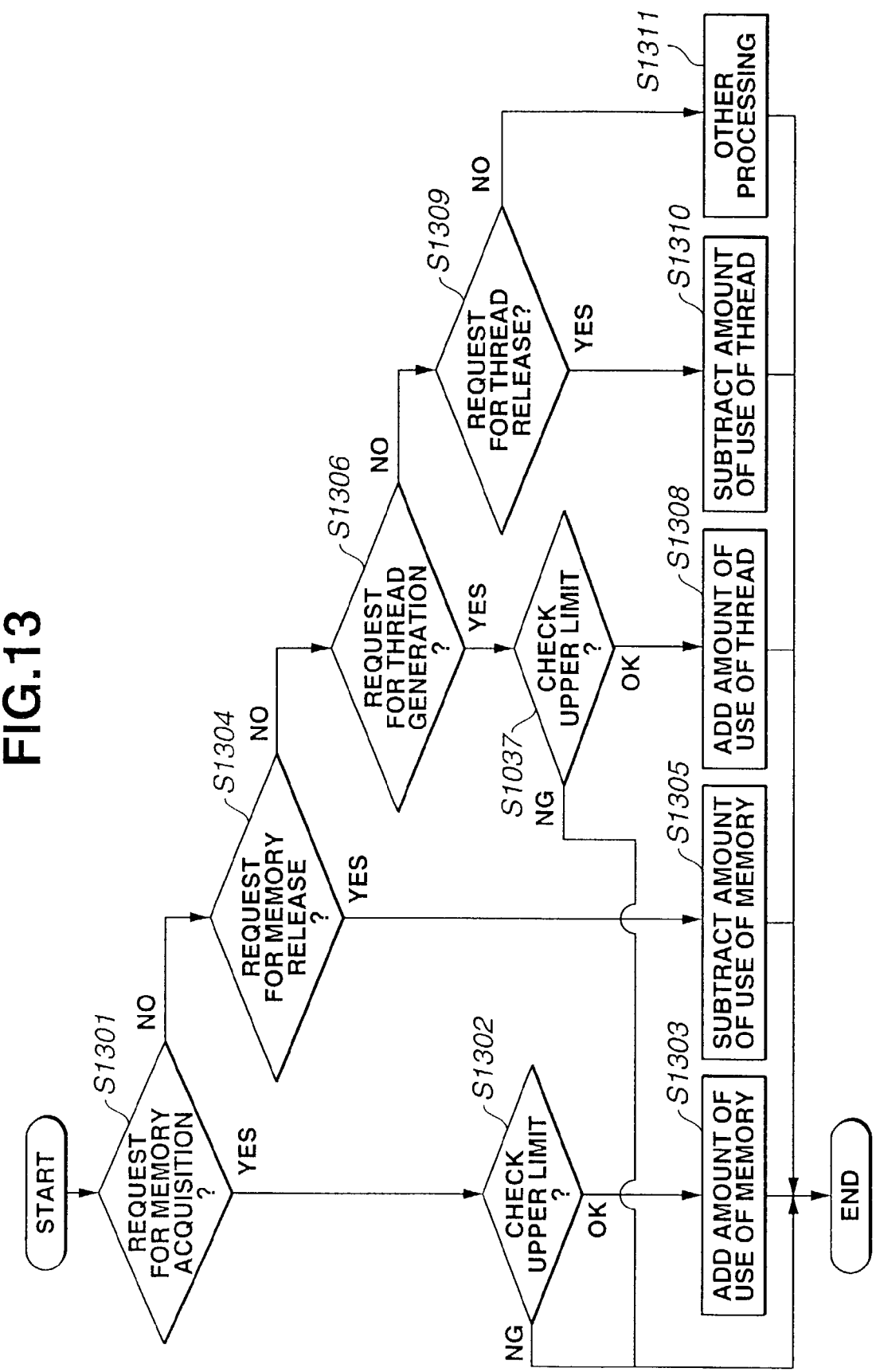
FIG. 13 is a flowchart illustrating part of processing by a resource managing unit 311 shown in FIG. 3.

FIG. 13 is a flowchart illustrating part of the processing of the resource managing unit 311, serving as a preferable example of resource managing means of the invention.

In step S1301, it is determined whether or not a request for acquiring a memory performed via the OS 305 is to be accepted. If the result of the determination in step S1301 is affirmative, the process proceeds to step S1302. If the result of the determination in step S1301 is negative, the process proceeds to step S1304. In step S1302, it is checked if the size obtained by adding the memory size for the current request to the sum of the memory size for past requests for memory acquisition reaches an upper limit. If the result of the check in step S1302 is OK, the process proceeds to step S1303. If the result of the check in step S1302 is NG, the process is terminated assuming an error status.

In step S1303, the memory size for the current request is added to the sum of the memory size for past requests for memory acquisition, and a requested memory region is allocated. In step S1304, it is determined whether or not a request for memory release is present. If the result of the determination in step S1304 is affirmative, the process proceeds to step S1305. If the result of the determination in step S1304 is negative, the process proceeds to step S1306. In step S1305, the memory size for the current request is subtracted from the sum of the memory size for past requests for memory acquisition performed via the OS 305, and the allocated memory region is released.

In step S1306, it is determined whether or not a request for generating a thread is present. If the result of the determination in step S1306 is affirmative, the process proceeds to step S1307. If the result of the determination in step S1306 is negative, the process proceeds to step S1309. In step S1307, it is checked if a number obtained by adding the current request to the number of threads generated in past via the OS 305 reaches a predetermined usable upper limit. If the result of the check in step S1307 is OK, the process proceeds to step S1308. If the result of the check in step S1307 is NG, the process is terminated assuming an error status.

In step S1308, the current request is added to the number of threads generated in past via the OS 305, and a thread is generated.

In step S1309, it is determined whether or not a request for releasing a thread is present. If the result of the determination in step S1309 is affirmative, the process proceeds to step S1310. If the result of the determination in step S1309 is negative, the process proceeds to step S1311. In step S1310, the thread of the current request is subtracted from the number of threads generated in past via the OS 305, and the allocated thread is released. In step S1311, other processing is performed. Although in the first embodiment, only the amount of use of the memory and the number of generated threads are described, the present invention may, of course, also be applied to any other appropriate resources, such the number of sockets used for communication in the network processing unit 7.

Next, a second embodiment of the present invention will be described with reference to FIGS. 6, 7, 8, 14, 15 and 16.

As shown in the summary of application software 801 in FIG. 8, the number of sets of application software that can be downloaded or started in the first embodiment can be increased from the number of the mode keys 730, 731 and 732 shown in FIG. 7 (three in the first embodiment).

The second embodiment deals with such a situation.

Figure 14:
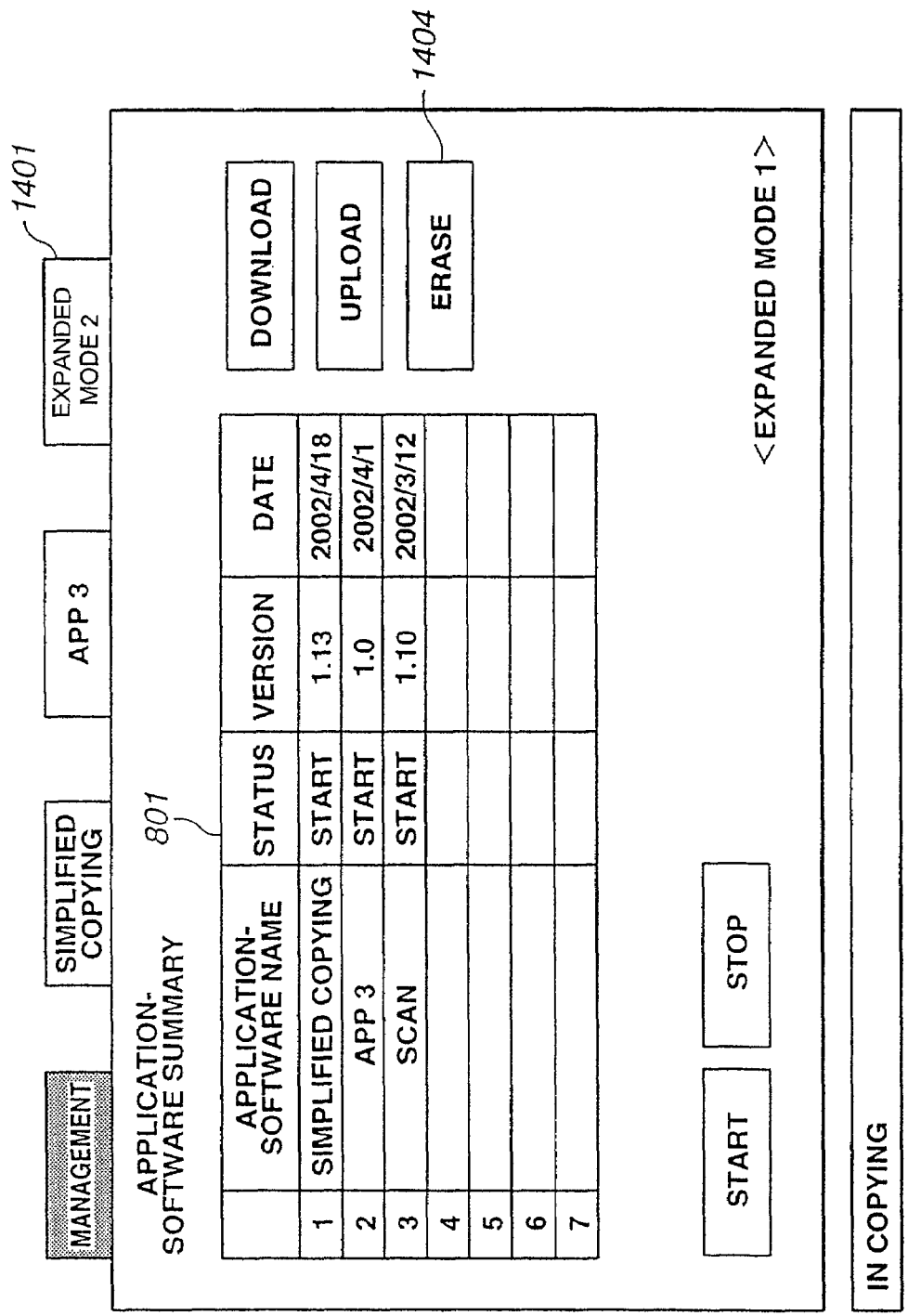
FIG. 14 is a diagram illustrating a picture frame immediately after newly starting Scan application software in FIG. 8.

FIG. 14 is a diagram illustrating a picture frame immediately after the Scan application software is newly started in FIG. 8. An expanded-mode-2 key 1401 is a mode key, serving as an example of the selection key of the invention, and for shifting to another picture frame (see FIG. 5) for selecting and executing application software executed in the second execution environment 305 of the invention. Although in the second embodiment, this key is displayed in the same manner as selection of other mode keys, this key may be displayed so as to be visually recognized more easily, for example, by changing the size or the design of the key.

Figure 15:
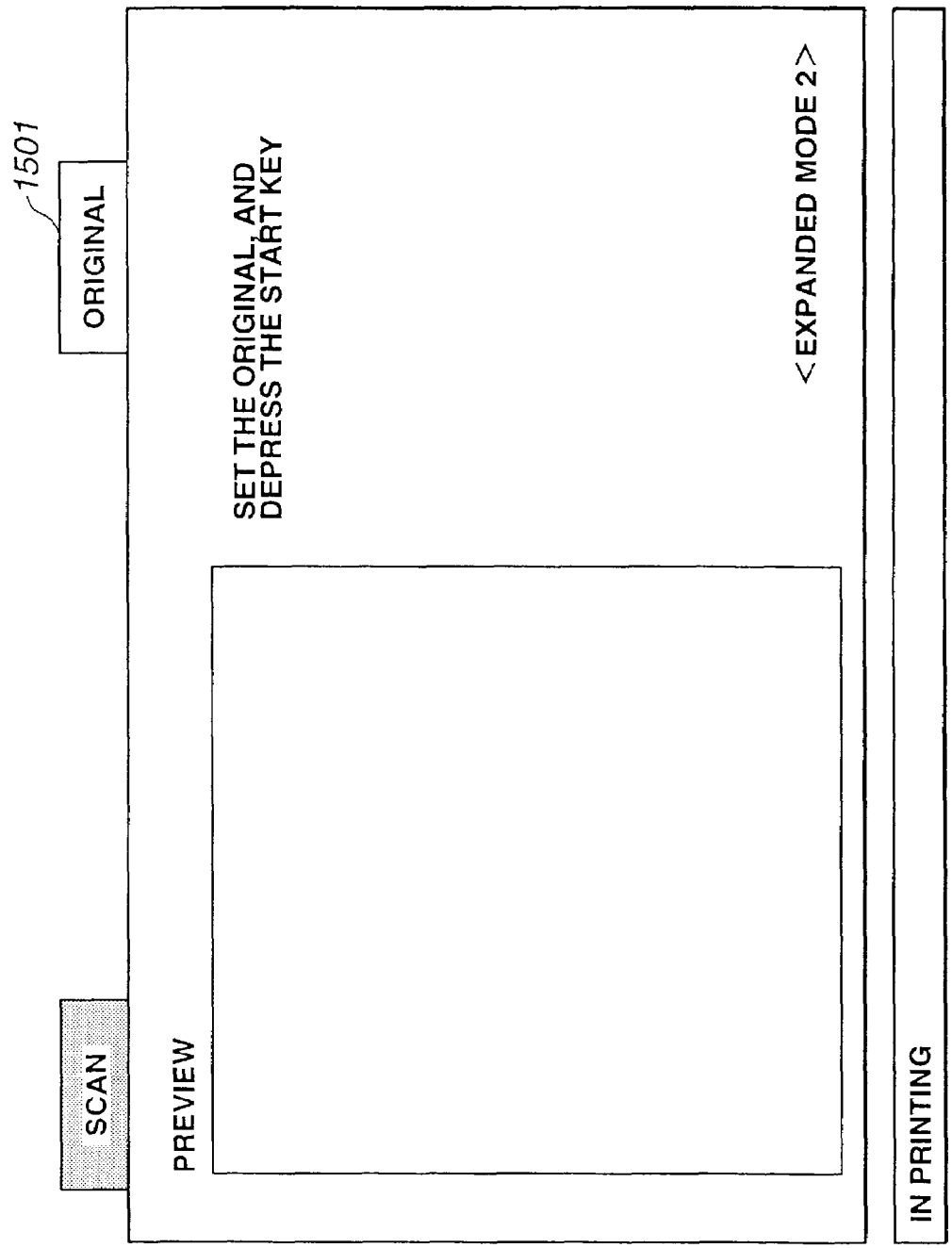
FIG. 15 is a diagram illustrating a picture frame when an expanded-mode-2 key 1401 shown in FIG. 14.

FIG. 15 illustrates a picture frame when the expanded-mode-2 key 1401 is selected. An Original-mode key 1501 is a mode key, serving as an example of the selection key, and for shifting to another picture frame (see FIG. 6) for selecting and executing application software executed in the real-time OS 301, serving as an example of the first execution environment of the invention. The function of this mode key is the same as that of the mode key 733 in the first embodiment. Although in the second embodiment, this key is displayed in the same manner as selection of other mode keys, this key may be displayed so as to be visually recognized more easily, for example, by changing the size or the design of the key.

When the Scan application software is stopped or erased in the operation picture surface shown in FIG. 14, the picture frame returns to the picture frame shown in FIG. 8. That is, since it is arranged so that only selection keys up to four keys at maximum, inclusive of a key for shift, are displayed on one picture frame, if the Scan application software is added and started in the state shown in FIG. 8, the state shown in FIG. 14 appears, and the expanded-mode-2 key 1401 appears. Upon depression of the expanded-mode-2 key 1401, the picture frame shifts to the picture frame shown in FIG. 15. When other programs are further added in the state shown in FIG. 15, selection keys successively appear at upper portions of FIG. 15 (to the right of the Scan key and to the left of the Original key), resulting in a picture frame similar to FIG. 14 (drawing omitted).

Figure 16:
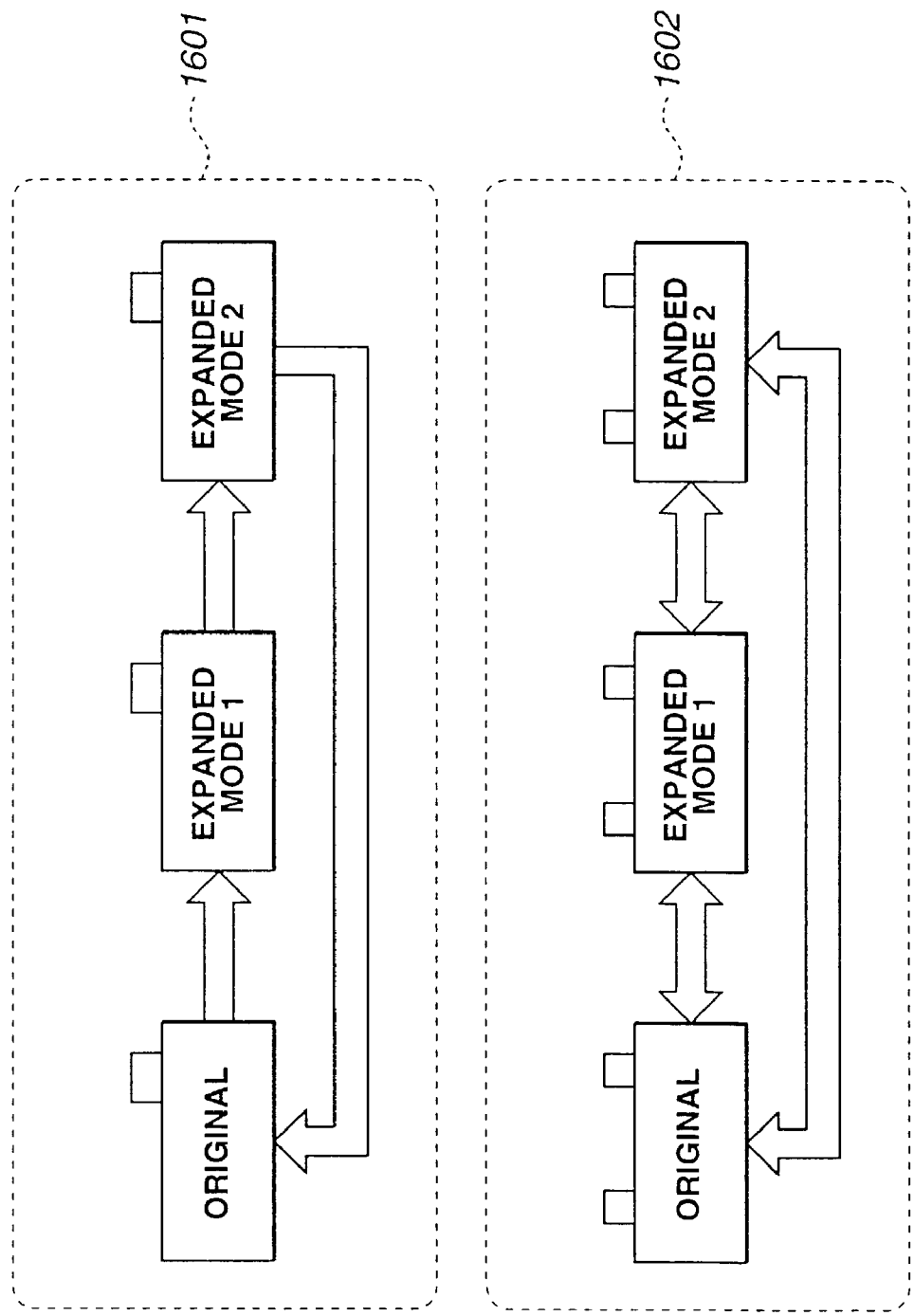
FIG. 16 is a diagram illustrating a transition sequence of a display picture frame displayed on the display unit of the operation unit 500.

FIG. 16 is a diagram illustrating a transition sequence of display picture frames displayed on the display unit of the image forming apparatus. Although in the second embodiment, transition 1601 is performed, a mode key for moving respective frames in the forward or backward direction as represented by reference numeral 1602 may be provided. There is no limitation in means for realizing transition provided that operation picture frames dynamically increase as the number of sets of application software being started increases.

Although in the second embodiment, only the case in which the number of sets of application software at the OS 2 increases is described, the present invention may, of course, also be applied to a case in which the number of sets of application software at the OS 1 increases, by using an Original-mode key, an Original-2-mode and the like.

Figure 19:
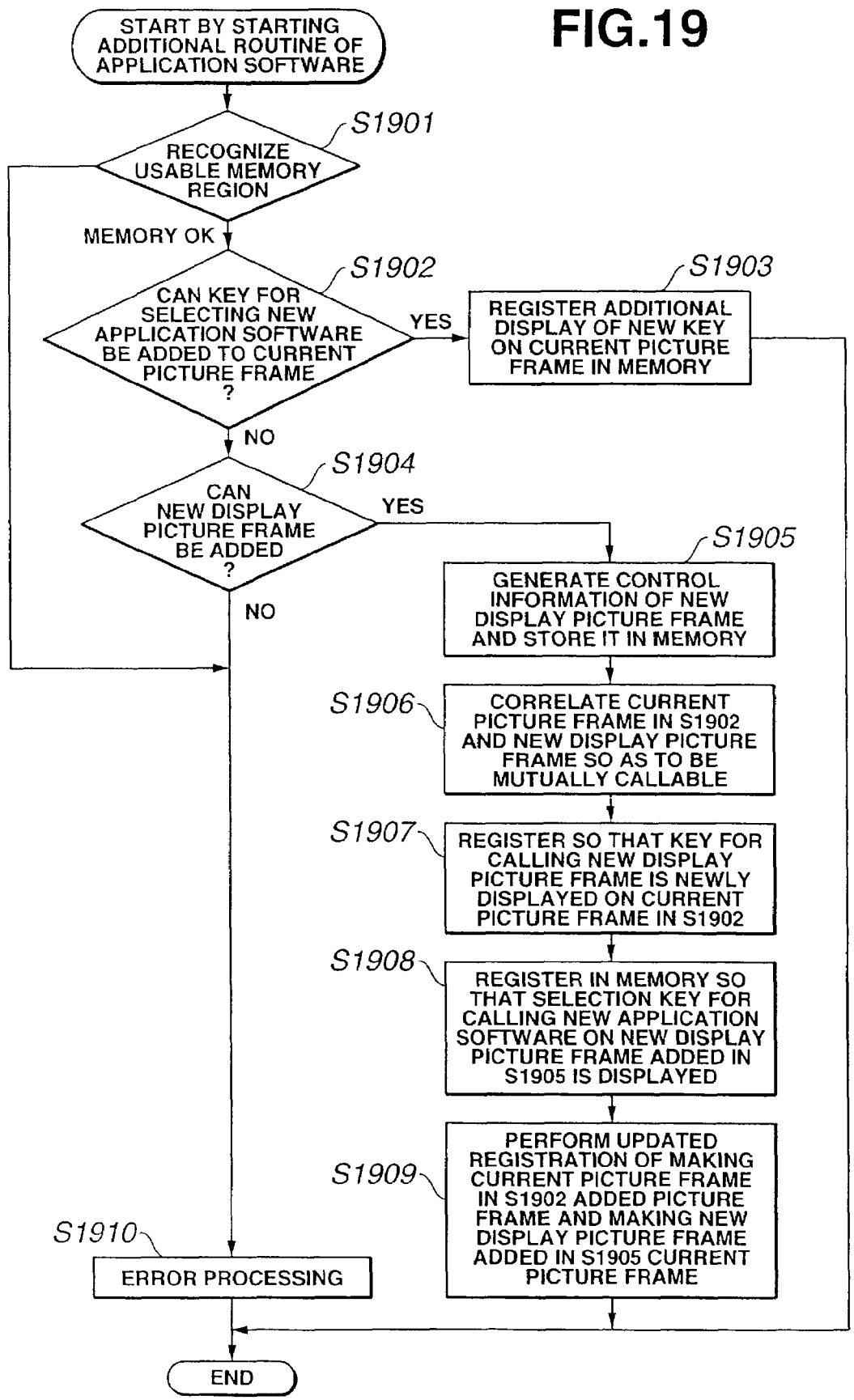
FIG. 19 is a diagram illustrating an example of processing after starting an application-software adding routine.

FIG. 19 is a flowchart illustrating an example of processing after starting an additional routine of application software that is started in response to downloading of the application software or registration (input) of the application software in the memory of the image forming apparatus. For example, the additional routine is started when an OK button 1003 shown in FIG. 10 is depressed. In the second embodiment, it is assumed that the Scan program is newly downloaded in the image forming apparatus. In step S1901, the resource managing unit newly adds a program to the image forming apparatus, and checks if a storage region sufficient enough for newly storing a display picture frame is present within the image forming apparatus. If the result of the check is NG, the process proceeds to error processing in step S1910, and the process is terminated. If the result of the check is OK, the process proceeds to step S1902. In step S1902, the control application software (display control means) 9 determines whether or not a function selection key for selecting new application software, for example, similar to each of the selection keys (820-823) shown at upper portion of FIG. 8 can be added to the current picture frame. The current picture frame is a picture frame currently being used, or a display picture frame for adding a selection key capable of instructing selection or execution of a new program when the program is added. If the result of the determination in step S1902 is affirmative, the process proceeds to step S1903, where the display control application software 9 registers display control information in the memory within the image forming apparatus so as to display a picture frame obtained by adding a new function selection key to the current picture frame, and terminates the process. If the result of the determination in step S1902 is negative, the process proceeds to step S1904, where it is determined whether or not a new display picture frame (see FIG. 15) to be switched from the current display picture frame can be added. When it is assumed that it is set in advance that the maximum number of selection keys is four in FIG. 8, then, when adding a Scan program using, for example, the picture frame shown in FIG. 9, the display control program registers the Scan program in the memory within the image forming apparatus so as to be called by correlating the picture frames of FIGS. 14 and 15. The number of selection keys that can be displayed is not limited to four, but may be variable depending on the situation.

If the result of the determination in step S1904 is negative due to exhaustion of an ID that can correspond to the display picture frame, or full occupation of the storage region, the process proceeds to step S1910, where error processing is performed. If the result of the determination in step S1904 is affirmative, the process proceeds to step S1905, where the control application software 9 generates display control information for a new display picture frame and registers the information in the memory. Then, in step S1906, the control application software 9 alternately calls the current picture frame in step S1902 and the new display picture frame, to correlate them so as to be shifted. Then, in step S1907, display control information (for example, display control information shown in FIG. 14) is registered in the memory so that a function selection key (for example, the expanded-mode-2 key 1401) for calling the new picture frame is newly displayed. Then, in step S1908, display control information is registered in the memory so that the function selection key for instructing selection of new application software is displayed in the new display picture frame added in step S1905. Then, in step S1909, updated registration of making the current picture frame in step S1902 an added picture frame in which a function selection key cannot be further added, and making the new picture frame added in step S1905 the current picture frame is performed, and then the process is terminated.

Using a plurality of managing application software mounted within the image forming apparatus, processing of downloading a program (first application software) in the real-time OS and a program (second application software) in the virtual machine from an outside of the image forming apparatus into the image forming apparatus, uploading the programs from the image forming apparatus into an outside of the image forming apparatus, or erasing or invalidating the programs may be performed.

A case in which managing application software deletes application software executable in the virtual machine can also be considered. For example, a display control program (determination means/display control means) displays selection keys including a plurality of selection keys for selecting and assigning a desired program from among a plurality of programs stored in a copier on a display picture frame of an operation unit of the copier. In response to deletion of a program within the copier, it is determined whether or not a selection key corresponding to application software to be deleted, and a key corresponding to application software to be remained within the image forming apparatus can be displayed on one picture frame of the display picture frame of the display unit. For example, in the state shown in FIG. 14, when the erasure button 1404 is depressed, Scan application software is deleted. At the same time, it is arranged so that the expanded-mode-2 button is not displayed from the display picture frame (the first display picture frame) shown in FIG. 14. That is, the display control program registers display information prohibiting calling of the picture frame (the second display picture frame) shown in FIG. 15 from the display picture frame (the first display picture frame) shown in FIG. 14 in the memory.

In the API 303 and the control unit 302 shown in FIG. 5, if exclusive execution of a control command of the image forming apparatus is allowed, it is arranged to call an interface controlling the image forming apparatus via the API 303 both from the first execution environment and the second execution environment. Accordingly, an application module in each of the execution environments can sequentially use the functions of the image forming apparatus. As a result, it is possible to stably operate the image forming apparatus.

It is possible to develop and use application software having equivalent capabilities in any of the execution environments. It is possible to develop and execute a control program aiming at part of performances in the first execution environment. As described above, the user can select the first execution environment or the second execution environment in accordance with requests for specifications, such as portability, a response property or the like. It is only necessary to add an identifier to an interface, and a composite apparatus automatically causes an appropriate apparatus to execute a command by determining the identifier. Accordingly, it is possible to realize compatibility with a communication environment, such as a network environment or the like.

By allowing to download, upload, erase or invalidate an application module from an external interface of an image forming apparatus, the operability of the image forming apparatus can be improved.

When adding application software, by comparing versions or the like, and prohibiting downloading of the application software when conditions do not coincide, the reliability of an image forming apparatus can be improved.

OTHER EMBODIMENTS

The processes show in FIGS. 12, 13, 18, 19 and the like in the first embodiment are executed by each of the image forming apparatuses 100 and 200 based on a program installed from the outside. In such cases, the present invention may also be applied to a case in which an information group including the program is supplied from a storage medium, such as a CD-ROM, a flash memory, an FD (floppy disk) or the like of an external computer, or from an external storage medium via a network.

The objects of the present invention may, of course, also be achieved by supplying a system or an apparatus with a storage medium storing program codes of software for realizing the functions of the above-described embodiments, or downloading the program codes from an external server (now shown), and reading and executing the program codes stored in the storage medium by means of a control unit (a CPU or an MPU (microprocessor unit)) of the system or the apparatus.

In such a case, the program codes themselves read from the storage medium realize the new functions of the present invention, so that the storage medium storing the program codes constitutes the present invention. For example, a floppy disk, a hard disk, an optical disk, a magnetooptical disk, a DVD (digital versatile disc), a CD-ROM, a magnetic tape, a nonvolatile memory card, a ROM, an EEPROM (electrically erasable and programmable read-only memory), or the like may be used as the storage medium for supplying the program codes.

The present invention may, of course, be applied not only to a case in which the functions of the above-described embodiments are realized by executing program codes read by a CPU, but also to a case in which an OS or the like operating in a computer executes a part or the entirety of actual processing, and the functions of the above-described embodiments are realized by the processing. The present invention may, of course, also be applied to a case in which, after writing program codes read from a storage medium into a memory provided in a function expanding board inserted into an image forming apparatus or in a function expanding unit connected to a computer, a CPU or the like provided in the function expanding board or the function expanding unit performs a part or the entirety of actual processing, and the functions of the above-described embodiments are realized by the processing.

As described above, according to the present invention, in an image forming apparatus capable of executing various types of application software and control programs, it is possible to improve the development efficiency of the application software and the control programs.

According to another aspect of the present invention, when constructing a second execution environment in a first execution environment within an image forming apparatus, it is possible to realize an environment having high portability of a program in the second environment and having flexibility capable of easily controlling various functions of the image forming apparatuses, by providing a scheme to utilize functions provided in the first execution environment.

According to still another aspect of the present invention, it is possible to utilize development resources executable in another execution environment that have been developed in order to control an image forming apparatus, from an execution environment having high portability.

The individual components shown in outline or designated by blocks in the drawings are all well known in the image forming apparatus, control method and control program arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus having a first execution environment that can execute at least one of first-format instructions for controlling an image forming engine of said image forming apparatus in native mode by using real a real-time operating system, and a second execution environment that can execute at least one of second-format instructions defined by a format that does not depend on a type of said image forming apparatus, said image forming apparatus comprising:

first control means for controlling processing of execution of the at least one of the first-format instructions in response to the at least one of the second-format instructions of the second execution environment, using at least one of second-format predetermined instructions;

recognition means for recognizing, when interpreting the at least one of the second-format instructions from plural applications in the second execution environment, whether or not an instruction to be executed is the at least one of the second-format predetermined instructions; and second control means for controlling said image forming apparatus by executing the at least one of the first-format instructions in response to the at least one of the second-format predetermined instructions when said recognition means has recognized that the instruction to be executed is the at least one of the second-format predetermined instructions, and for controlling said image forming apparatus so as to execute the at least one of the second-format predetermined instructions in the second execution environment when said recognition means has recognized that the instruction to be executed is not the at least one of the second-format predetermined instructions, wherein the second-format predetermined instructions are part of a software interface library which is shared by the plural applications in the second execution environment and each of the second-format predetermined instructions corresponds to the first-format instructions which control the image processing engine, wherein, when controlling execution of the at least one of the first-format instructions using the at least one of the second-format predetermined instructions based on identification information added to the at least one of the second-format predetermined instructions, said second control means determines whether an instruction included in the first instruction controls a printing processing function within said image forming apparatus, or controls an external image forming apparatus via a communication network, and wherein plural first-format instructions correspond to one second-format instruction.

2. An image forming apparatus according to claim 1, wherein, when said recognition means determines that the instruction to be executed is not at least one of the second-format predetermined instructions, said second control means executes an instruction to control a graphical user interface of an operation unit of said image forming apparatus in the second execution environment.

3. An image forming apparatus according to claim 1, wherein said image forming apparatus comprises a printing apparatus having an engine unit, wherein the at least one of the second-format predetermined instructions is an instruction indicating control of the engine unit, and wherein in response to recognition of the at least one of the second-format predetermined instructions by said recognition means, said second control means controls the engine unit by causing the engine unit to execute the at least one of the first-format instructions based on the at least one of the second-format predetermined instructions.

4. An image forming apparatus according to claim 1, further comprising:
resource managing means for managing resources used by the second execution environment,
wherein said resource managing means limits resources that can be used by the second execution environment.

5. An image forming apparatus according to claim 1, wherein the at least one of the first-format instructions executed by said second control means controls an external image forming apparatus via a communication network.

6. An image forming apparatus according to claim 2, further comprising:
first-application-module managing means for managing a first application module operating in the first execution environment,
wherein said first-application-module managing means downloads or uploads the first application module from an outside of said image forming apparatus into said image forming apparatus or from said image forming apparatus to the outside of said image forming apparatus, respectively, or erases or invalidates the first application module.

7. An image forming apparatus according to claim 2, further comprising:
second-application-module managing means for managing a second application module operating in the second execution environment, in the second execution environment,
wherein said second-application-module managing means downloads or uploads the second application module from an outside of said image forming apparatus into said image forming apparatus or from said image forming apparatus to the outside of said image forming apparatus, respectively, or erases or invalidates the second application module.

8. A method in an image forming apparatus having a first execution environment that can execute at least one of first-format instructions for controlling an image forming engine of the image forming apparatus in native mode by using a real-time operating system, and a second execution environment that can execute at least one of second-format instructions defined by a format that does not depend on a type of the image forming apparatus, said method comprising:
a first control step of controlling processing of execution of the at least one of the first-format instructions in response to the at least one of the second-format instructions of the second execution environment, using at least one of second-format predetermined instructions; and
a recognition step of recognizing, when interpreting the at least one of the second-format instructions from plural applications in the second execution environment, whether or not an instruction to be executed is the at least one of the second-format predetermined instructions,
wherein the image forming apparatus is controlled by executing the at least one the first-format instructions in response to the at least one of the second-format predetermined instructions when it has been recognized in said recognition step that the instruction to be executed is the at least one of the second-format predetermined instructions, and the image forming apparatus is controlled so as to execute the at least one of the second-format predetermined instructions in the second execution environment when it has been recognized in said recognition step that the instruction to be executed is not the at least one of the second-format predetermined instructions; and
wherein the second-format predetermined instructions are part of a software interface library which is shared by the plural applications in the second execution environment and each of the second-format instructions corresponds to the first-format instructions which control the image processing engine,
wherein, when controlling execution of the at least one of the first-format instructions using the at least one of the second-format predetermined instructions based on identification information added to the at least one of the second-format predetermined instructions, a determination is made whether an instruction included in the first instruction controls a printing processing function within said image forming apparatus, or controls an external image forming apparatus via a communication network, and
wherein plural first-format instructions correspond to one second-format instruction.

9. A method according to claim 8, wherein, when it is determined in said recognition step that the instruction to be executed is not the at least one of the second-format predetermined instructions, then, in said control step, an instruction to control a graphical user interface of an operation unit of the image forming apparatus is executed in the second execution environment.

10. A method according to claim 8, wherein the image forming apparatus is a printing apparatus having an engine unit, wherein the at least one of the second-format predetermined instructions is an instruction indicating control of the engine unit, and wherein in response to recognition of the at least one of the second-format predetermined instructions in said recognition step, in said control step, the at least one of the first-format instructions is executed based on the at least one of the second-format predetermined instructions, and the engine unit is controlled.

11. A method according to claim 8, further comprising:
a resource managing step of managing resources used by the second execution environment,
wherein in said resource managing step, resources that can be used by the second execution environment are limited.

12. A method according to claim 8, wherein the at least one of the first-format instructions executed in said control step controls an external image forming apparatus via a communication network.

13. A method according to claim 8, further comprising:
a first-application-module managing step of managing a first application module operating in the first execution environment,
wherein, in said first-application-module managing step, there is performed processing of downloading or uploading the first application module from an outside of the image forming apparatus into the image forming apparatus or from the image forming apparatus to the outside of the image forming apparatus, respectively, or erasing or invalidating the first application module.

14. A method according to claim 8, further comprising:
a second-application-module managing step of managing a second application module operating in the second execution environment,
wherein, in said second-application-module managing step, there is performed processing of downloading or uploading the second application module from an outside of the image forming apparatus into the image forming apparatus or from the image forming apparatus to the outside of the image forming apparatus, respectively, or erasing or invalidating the second application module.

15. A computer-readable storage medium storing a computer-readable control program to be executed in an image forming apparatus having a first execution environment that can execute at least one of the first-format instructions for controlling an image forming engine of said image forming apparatus in native mode by using a real-time operating system, and a second execution environment that can execute at least one of second-format instructions defined by a format that does not depend on a type of the image forming apparatus, said control program causing a CPU (central processing unit) to execute the following steps comprising:

a first control step of controlling processing of execution of the at least one of the first-format instructions in response to the at least one of the second-format instructions of the second execution environment, using at least one of second-format predetermined instructions;

a recognition step of recognizing, when interpreting the at least one of the second-format instructions from plural applications software in the second execution environment, whether or not an instruction to be executed is the at least one of the second-format predetermined instructions; and a second control step of controlling the image forming apparatus by executing the at least one of the first-format instructions in response to the at least one of the second-format predetermined instructions when, in said recognition step, it has been recognized that the instruction to be executed is the at least one of the second-format predetermined instructions, and for controlling the image forming apparatus so as to execute the at least one of the second-format predetermined instructions in the second execution environment when, in said recognition step, it has been recognized that the instruction to be executed is not the at least one of the second-format predetermined instructions, wherein the second-format predetermined instructions are part of a software interface library which is shared by the plural applications in the second execution environment and each of the second-format predetermined instructions corresponds to the first-format instructions which control the image processing engine, wherein, when controlling execution of the at least one of the first-format instructions using the at least one of the second-format predetermined instructions based on identification information added to the at least one of the second-format predetermined instructions, a determination is made whether an instruction included in the first instruction controls a printing processing function within said image forming apparatus, or controls an external image forming apparatus via a communication network, and wherein plural first-format instructions correspond to one second-format instruction.

* * * * *